(12) United States Patent
Maeda

(10) Patent No.: US 6,557,264 B1
(45) Date of Patent: May 6, 2003

(54) INVERTABLY STANDABLE COOKING UTENSIL

(75) Inventor: Yutaka Maeda, Yokohama (JP)

(73) Assignee: Asia Industrial Co., Ltd., Chiba-ken (JP)

( * ) Notice: Subject to any disclaimer, the term of this patent is extended or adjusted under 35 U.S.C. 154(b) by 261 days.

(21) Appl. No.: 09/633,741

(22) Filed: Aug. 7, 2000

(30) Foreign Application Priority Data

| Aug. 9, 1999 | (JP) | ............................................. 11-225445 |
| Nov. 29, 1999 | (JP) | ........................................... 11-337260 |
| Jul. 18, 2000 | (JP) | ........................................ 2000-216864 |

(51) Int. Cl.$^7$ ............................................. A47J 43/00
(52) U.S. Cl. ............................. 30/327; 30/124; 30/125; 30/137; 30/323; 30/326; 30/298.4; 294/8; D7/688; D7/653; 15/236.01; 16/111.1; D8/7; D8/105; D8/107; D8/DIG. 4
(58) Field of Search ....................... 30/323, 327, 298.4, 30/169, 124, 125, 137, 141, 278, 340, 295, 326; 15/236.01; 16/111.1; D7/653, 657, 664, 691, 688; D8/7, 105, 107, 301, 323, 373, 376, DIG. 4; 294/7, 8; 141/24, 98

(56) References Cited

U.S. PATENT DOCUMENTS

| 135,975 | A | * | 2/1873 | Draper ............................. 2/17 |
| D32,918 | S | * | 7/1900 | Ericson ......................... D7/688 |
| 683,897 | A | * | 10/1901 | Stryker ......................... 383/57 |
| D39,441 | S | * | 8/1908 | Bain ............................ D7/688 |
| 1,327,982 | A | * | 1/1920 | Burns ........................... 30/323 |
| 1,730,458 | A | * | 10/1929 | Ham ............................. 30/136 |
| 2,212,197 | A | * | 8/1940 | Roesch et al. ................. 30/169 |
| 2,460,887 | A | * | 2/1949 | Kriz, Jr. ..................... 30/120.1 |
| 2,597,275 | A | * | 5/1952 | Ahlstrand .................... 248/37.6 |
| D180,175 | S | * | 4/1957 | Bull ............................. D7/664 |
| 2,853,780 | A | * | 9/1958 | Bull ............................. 30/295 |
| 3,064,352 | A | * | 11/1962 | Koe ............................ 30/298.4 |
| 4,192,360 | A | * | 3/1980 | Rodriquez .................... 141/24 |
| 4,218,167 | A | * | 8/1980 | Mansfield ....................... 414/9 |
| D364,075 | S | * | 11/1995 | Brogren ....................... D7/653 |
| 5,590,472 | A | * | 1/1997 | Yaakov ....................... 30/323 |
| D436,810 | S | * | 1/2001 | Slater .......................... D7/688 |

FOREIGN PATENT DOCUMENTS

| JP | 58-71351 | 5/1983 |
| JP | 59-168243 | 11/1984 |
| JP | 4-103821 | 9/1992 |

* cited by examiner

*Primary Examiner*—Boyer D. Ashley
(74) *Attorney, Agent, or Firm*—Frishauf, Holtz, Goodman & Chick, P.C.

(57) ABSTRACT

A cooking utensil is provided which can be stood invertedly upright and stored temporarily in a hygienic manner, without taking up space. The cooking utensil includes a shank portion, a head portion, a supporting member, and a liquid receiving member. The supporting member is formed at an end section of the shank portion and supports the cooking utensil in an inverted upright state with the head portion in an upward position. And the liquid receiving member is formed on the shank portion and/or head portion for receiving liquid adhering to the head portion when the cooking utensil is invertably stood.

10 Claims, 25 Drawing Sheets

(a)

(b)

(a)

(b)

(c)

(a)

(b)

(a)

(b)

(c)

(a)

(b)

(a)

(b)

(c)

(a)

(b)

(a)

(b)

(a)

(b)

(a)

(b)

(c)

(d)

(e)

(a)

(b)

(a)

(b)

INVERTABLY STANDABLE COOKING UTENSIL

BACKGROUND OF THE INVENTION

The present invention relates to a cooking utensil which can be held in an inverted upright state.

When a cooking utensil, such as a ladle, rice paddle, turner, or the like, is not being used temporarily during cooking, a problem arises in terms of where to place the utensil. For example, if soup in a saucepan is stirred using a ladle and is then to be heated further, the ladle is either left in the pan or it is placed on a worktop, or the like, in the kitchen. However, if the ladle is left inside the pan, then the grip portion of the ladle may become hot due to the heat from the heat source of the burner, or the like, which is transmitted upwards along the outer sides of the pan, and it may become impossible to touch the grip portion of the ladle, or the grip portion may even be melted by the heat. Moreover, if the ladle is left on a worktop in the kitchen, it takes up free space and is liable to roll over due to poor positional seating, and therefore it may interfere with other tasks. Furthermore, since liquid adhering to the bowl portion of the ladle may spill on to the worktop, the worktop is liable to become soiled.

In order to resolve these problems, a ladle has been proposed which comprises a flat portion formed in the base of the bowl portion thereof, in such a manner that the ladle can be stood upright with the bowl portion being in a downward position. This allows the ladle to stand in an upright state in the center of a pan, or to stand in an upright state on top of a worktop, for example. However, standing the ladle in the center of the pan is not suitable in cases where, for example, a lid must be placed on the pan, and furthermore, if the ladle is stood on top of a worktop, then the bowl portion which comes into direct contact with food will touch the surface of the worktop and hence problems of hygiene arise. In order to resolve such problems, it has been proposed that the ladle is used in combination with a ladle receiving dish, whereby the ladle is held upright in the receiving dish, but this increases the number of components and the complexity of the device.

Similar problems also apply to a turner, and the like, although in the case of a utensil having a plate-shaped head portion, such as a turner, or the like, it is not possible to stand the utensil in an upright position as described above.

The present invention was devised with the foregoing problems in view, and aims to provide an invertably standable cooking utensil which occupies reduced space when stood temporarily, and which resolves problems of hygiene by preventing dispersal of liquid adhering to the head portion of the utensil when the utensil is stood in an inverted state with the head portion in an upward position and the grip portion in a downward position.

SUMMARY OF THE INVENTION

According to one embodiment of the present invention, an invertably standable cooking utensil is provided which comprises a shank portion, a head portion, a supporting member formed at an end section of the shank portion for holding the cooking utensil in an inverted upright state with the head portion in an upward position, and a liquid receiving member formed on the shank portion.

BRIEF DESCRIPTION OF THE DRAWINGS

FIGS. 8(a) and 8(b) are enlarged view elevational views showing the head portion and a liquid receiving member of an invertably standable cooking utensil according to a further embodiment of the present invention, wherein FIG. 8(a) is an enlarged elevational view showing the head portion and a liquid receiving member, and FIG. 8(b) is a perspective view of same;

FIGS. 9(a) and 9(b) are enlarged view elevational view showing the head portion and a liquid receiving member of an invertably standable cooking utensil according to a further embodiment of the present invention, wherein FIG. 9(a) is an enlarged elevational view showing the head portion and a liquid receiving member, and FIG. 9(b) is a perspective view of same.

FIGS. 10(a), 10(b) and 10(c) are enlarged view elevational views showing the head portion and a liquid receiving member of an invertably standable cooking utensil according to a further embodiment of the present invention, wherein FIG. 10(a) is an enlarged elevational view showing the head portion and a liquid receiving member, FIG. 10(b) is a side view of same, and FIG. 10(c) is a perspective view of same;

FIGS. 11(a) and 11(b) are enlarged views showing the head portion and a liquid receiving member of an invertably standable cooking utensil according to a further embodiment of the present invention, wherein FIG. 11(a) is an enlarged elevational view showing the head portion and liquid receiving member, and FIG. 11(b) is a perspective view of same;

FIGS. 12(a), 12(b) and 12(c) are enlarge views showing the head portion and liquid receiving member of an invertably standable cooking utensil according to a further embodiment of the present invention, wherein FIG. 12(a) is an enlarged elevational view showing the head portion and liquid receiving member, FIG. 12(b) is a side view of same, and FIG. 12(c) is a perspective view of same;

FIGS. 13(a) and 13(b) are enlarged views showing the head portion and liquid receiving member of an invertably standable cooking utensil according to a further embodiment of the present invention, wherein FIG. 13(a) is an enlarged elevational view showing the head portion and liquid receiving member, and FIG. 13(b) is a perspective view of same;

FIGS. 14(a), 14(b) and 14(c) are enlarged views showing the head portion and liquid receiving member of an invertably standable cooking utensil according to a further embodiment of the present invention, wherein FIG. 14(a) is an enlarged elevational view showing the head portion and liquid receiving member, FIG. 14(b) is a side view of same, and FIG. 14(c) is a perspective view of same;

FIGS. 17(a) and 17(b) are enlarged views showing the head portion liquid receiving member in an invertably standable cooking utensil according to a further embodiment of the present invention, wherein FIG. 17(a) is an enlarged side view showing the head portion and liquid receiving member, and FIG. 17(b) is a perspective view of same;

FIGS. 18(a) and 18(b) are enlarged views showing the head portion and liquid receiving member of an invertably standable cooking utensil according to a further embodiment of the present invention, wherein FIG. 18(a) is an enlarged side view showing the head portion and liquid receiving member, and FIG. 18(b) is a perspective view of same;

FIGS. 19(a) and 19(b) are enlarged views showing the head portion and liquid receiving member of an invertably standable cooking utensil according to a further embodiment of the present invention, wherein FIG. 19(a) is a perspective view, and FIG. 19(b) is a side view;

FIGS. 20(a) and 20(b) are enlarged views showing the head portion and liquid receiving member of an invertably standable cooking utensil according to a further embodiment of the present invention, wherein FIG. 20(a) is a perspective view, and FIG. 20(b) is a sectional side view of same;

FIGS. 21(a), 21(b), 21(c), 21(d) and 21(e) are enlarged views showing the head portion and liquid receiving member of an invertably standable cooking utensil according to a further embodiment of the present invention, wherein FIG. 21(a) is a front view, FIG. 21(b) is a side view, FIG. 21(c) is a rear view, FIG. 21(d) is a front view of a cooking utensil according to yet a further embodiment, and FIG. 21(e) is a side view of same;

FIGS. 22(a), 22(b), 22(c), 22(d) and 22(e) are enlarged views showing the head portion and liquid receiving member of an invertably standable cooking utensil according to a further embodiment of the present invention, wherein FIG. 22(a) is a front view, FIG. 22(b) is a side view, FIG. 22(c) is a rear view, FIG. 22(d) is a front view of a cooking utensil according to yet a further embodiment, and FIG. 22(e) is a side view FIGS. 23(a), 23(b), 23(c), 23(d) and 23(e) are enlarged views showing the head portion and liquid receiving member of an invertably standable cooking utensil according to a further embodiment of the present invention, wherein FIG. 23(a) is a front view, FIG. 23(b) is a side view, FIG. 23(c) is a rear view, FIG. 23(d) is a front view of a cooking utensil according to yet a further embodiment, and FIG. 23(e) is a side view of same;

FIGS. 24(a) and 24(b) are enlarged views showing the head portion and liquid receiving member of an invertably standable cooking utensil according to a further embodiment of the present invention, wherein FIG. 24(a) is a front view and FIG. 24(b) is a side view; and FIGS. 25(a) and 25(b) are enlarged views showing the head portion and liquid receiving member of an invertably standable cooking utensil according to a further embodiment of the present invention, wherein FIG. 25(a) is a front view and FIG. 25(b) is a side view.

DETAILED DESCRIPTION OF THE INVENTION

The present invention is described in detail below. For the sake of convenience, in the following description a ladle is used principally as an example of a cooking utensil.

Figure 1:
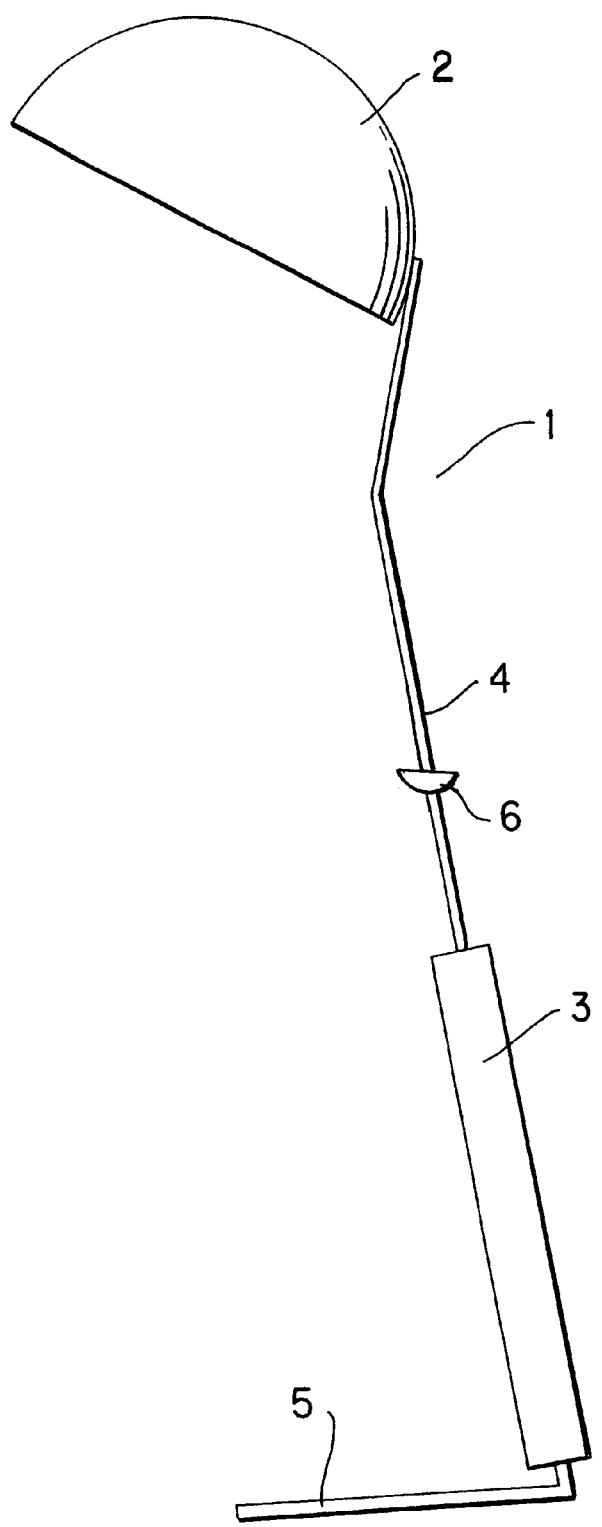
FIG. 1 is an elevational view of a cooking utensil (ladle) according to one embodiment of the present invention.

FIG. 1 illustrates one example of a cooking utensil (ladle) according to a first embodiment of the present invention.

The ladle 1 according to the present invention shown in FIG. 1 comprises a head portion (bowl portion) 2 and a shank portion 4. In the ladle shown in FIG. 1, a grip portion 3 is formed on a part of the shank portion (opposite side to head portion). A supporting member 5 is formed on the end of the grip portion 3. A liquid receiving member 6 is attached to the shank portion 4. When the ladle 1 is temporarily removed from a pan and set down, it is placed on a worktop, or the like, where the grip portion 3 is in a downward position, then the ladle 1 will be held in an upright inverted state by means of the supporting member 5. By adopting this construction, the bowl portion 2 does not come into direct contact with the worktop and therefore hygiene is maintained and moreover, since the utensil is standing upright, it does not take up space. Moreover, cooking utensils, such as a ladle and others, which are conventionally stored by being suspended from a shelf, or the like, can be aligned and stored neatly by standing them upright on a worktop.

Figure 2:
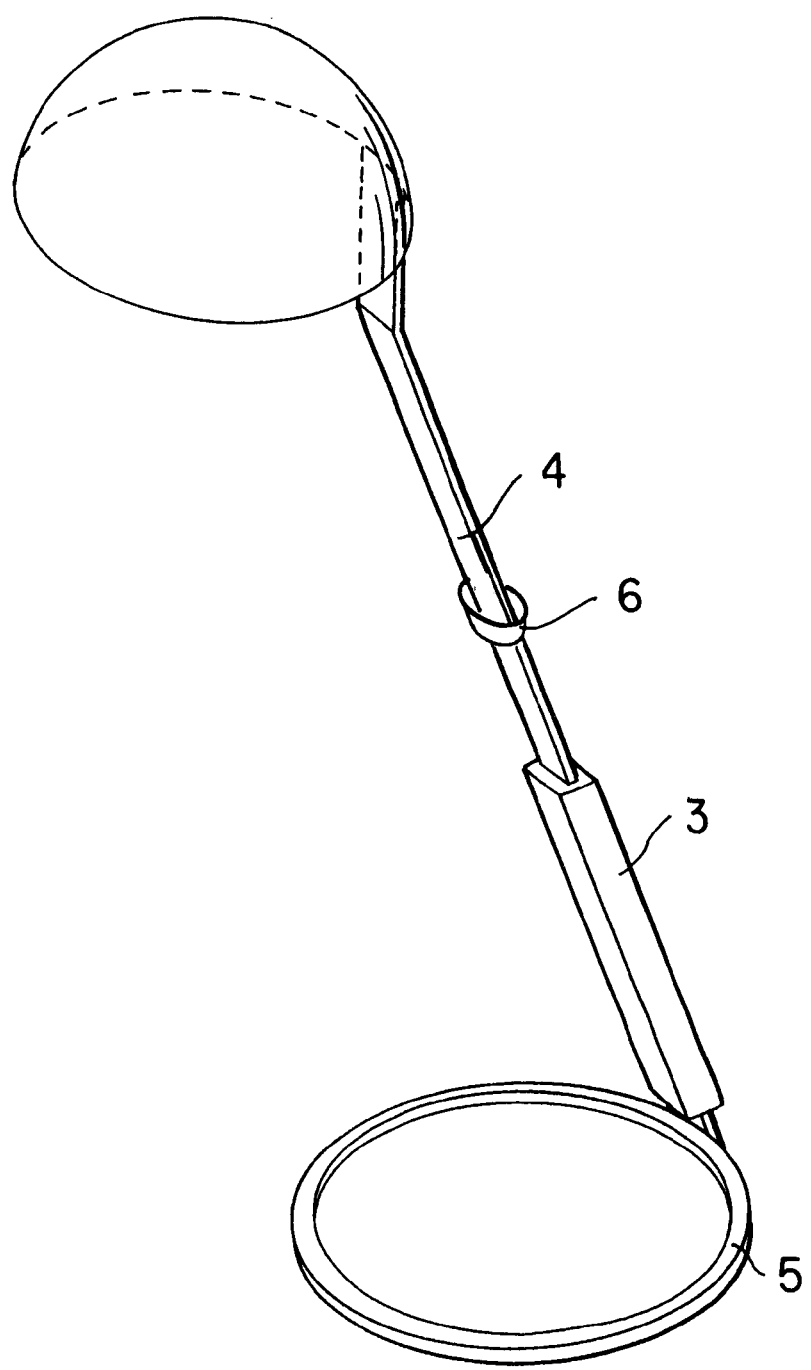
FIG. 2 is a perspective view of a cooking utensil (ladle) according to one embodiment of the present invention.
Figure 3:
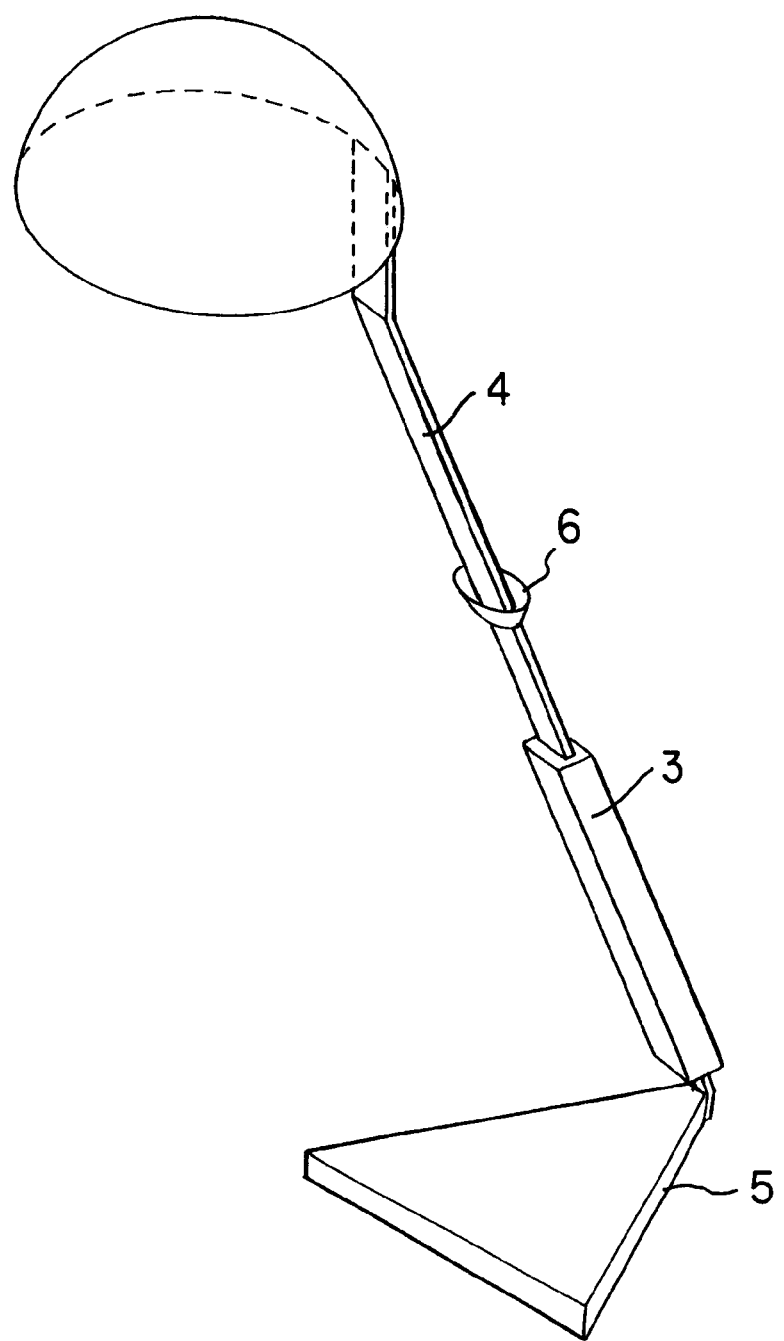
FIG. 3 is a perspective view of a cooking utensil (ladle) according to one embodiment of the present invention.

The supporting member 5 may have any shape, provided that it may support the ladle 1 securely in an upright inverted state. For example, it is possible to constitute a supporting member 5 by means of a ring-shaped wire member, as illustrated in FIG. 2. Moreover, it is also possible to constitute a supporting member 5 by means of a triangular (or polygonal) plate member, as illustrated in FIG. 3. Furthermore, a supporting member may be formed in a Y-shape or V-shape. If the supporting member 5 is constituted by means of a ring-shaped wire member, then when the cooking utensil is put away, it can be suspended by engaging a portion of the ring-shaped wire member with a hook, or the Like.

Furthermore, the supporting member may also be formed into the shape of an animal, flower or character, thereby creating visual appeal also. For example, it is possible to form the outline of an animal, or the like, by means of the ring-shaped wire member; alternatively, it is possible to form a plate-shaped member cut out in the shape of an animal, or the like, as the supporting member. For example, if the plate-shaped member is cut out in the shape of a rabbit to form a supporting member, then not only does this create visual appeal, but also, since the ear portions of the rabbit shape can be formed into long sections, it is possible to increase the surface area of the supporting member in an unobtrusive manner, thereby adding to the function of the supporting member and making it possible to stand the cooking utensil upright in a secure fashion.

Furthermore, in order that the ladle stands upright in a secure fashion, it is desirable that the supporting member 5 is formed in such a manner that the axis thereof forms an angle slightly smaller than a right-angle with respect to the axes of the grip portion 3 and shank portion 4, as illustrated in FIG. 1, and so on.

The supporting member may be formed integrally with the member constituting the shank portion of the ladle. In other words, the supporting member may be constituted by extending the member forming the shank portion through the grip portion and causing same to bend at the end of the grip portion. Moreover, the supporting member can also be formed integrally with the grip portion. In other words, the grip portion and the supporting member can be formed integrally in such a fashion that the supporting member is formed at the end section of a grip portion made from plastic, for example. Moreover, the supporting member may also be constituted by attaching a member other than the shank portion to the grip portion. The supporting member may be made from metal or plastic. The supporting member may also be attached to the grip portion in a detachable fashion. For example, a structure is adopted wherein the supporting member is attached by coupling it with the end of the grip portion, thereby allowing the supporting member to be removed when the cooking utensil is stored away, and to be coupled to the grip portion only when it is to be used. Alternatively, it is possible to cause the cooking utensil to stand upright by placing only the supporting member, in a detached state from the grip portion, on the worktop, or the like, and connecting the grip portion of the cooking utensil to said supporting member when the cooking utensil is temporarily set down.

Figure 4:
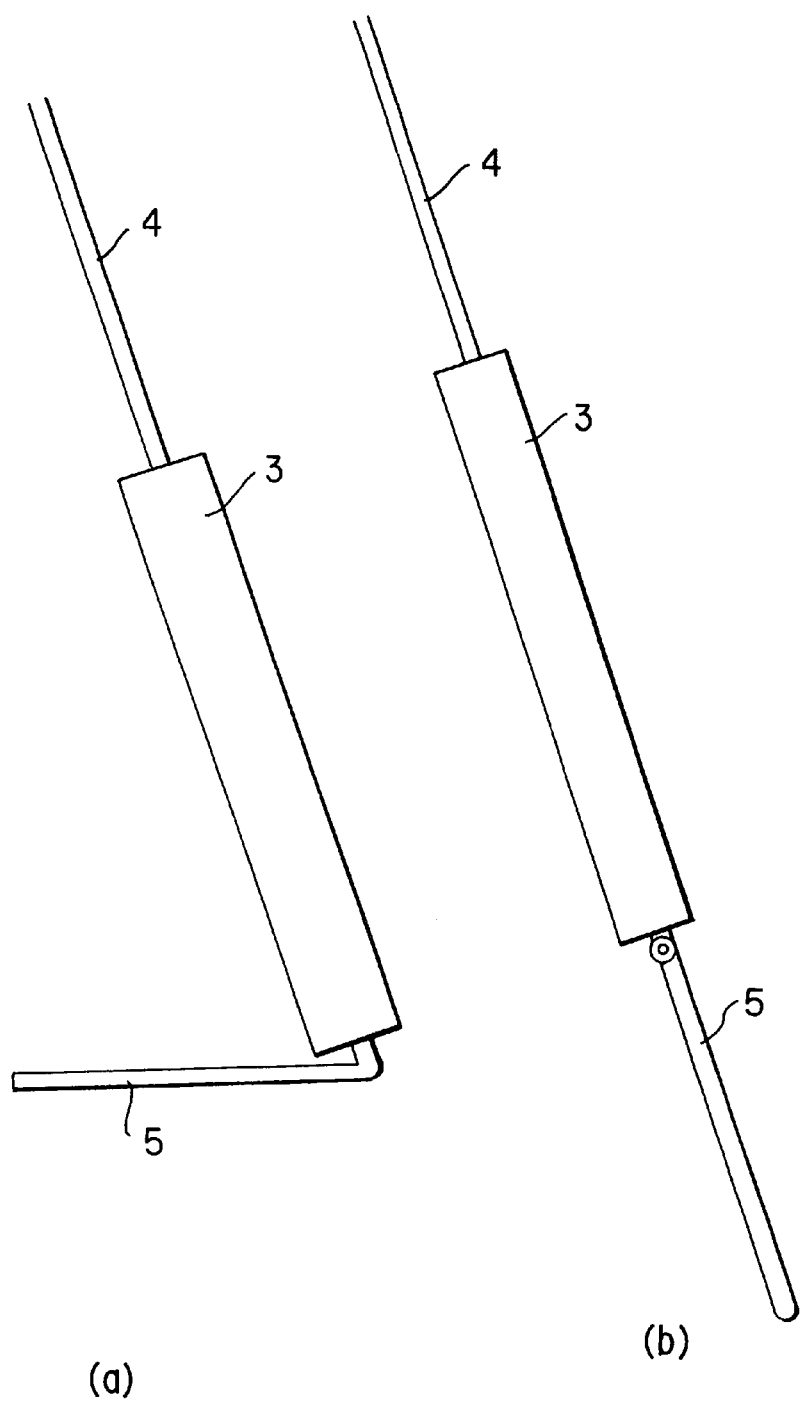
FIGS. 4(a) and 4(b) are elevational views showing various embodiments of a supporting member of a cooking utensil according to one embodiment of the present invention.
Figure 5:
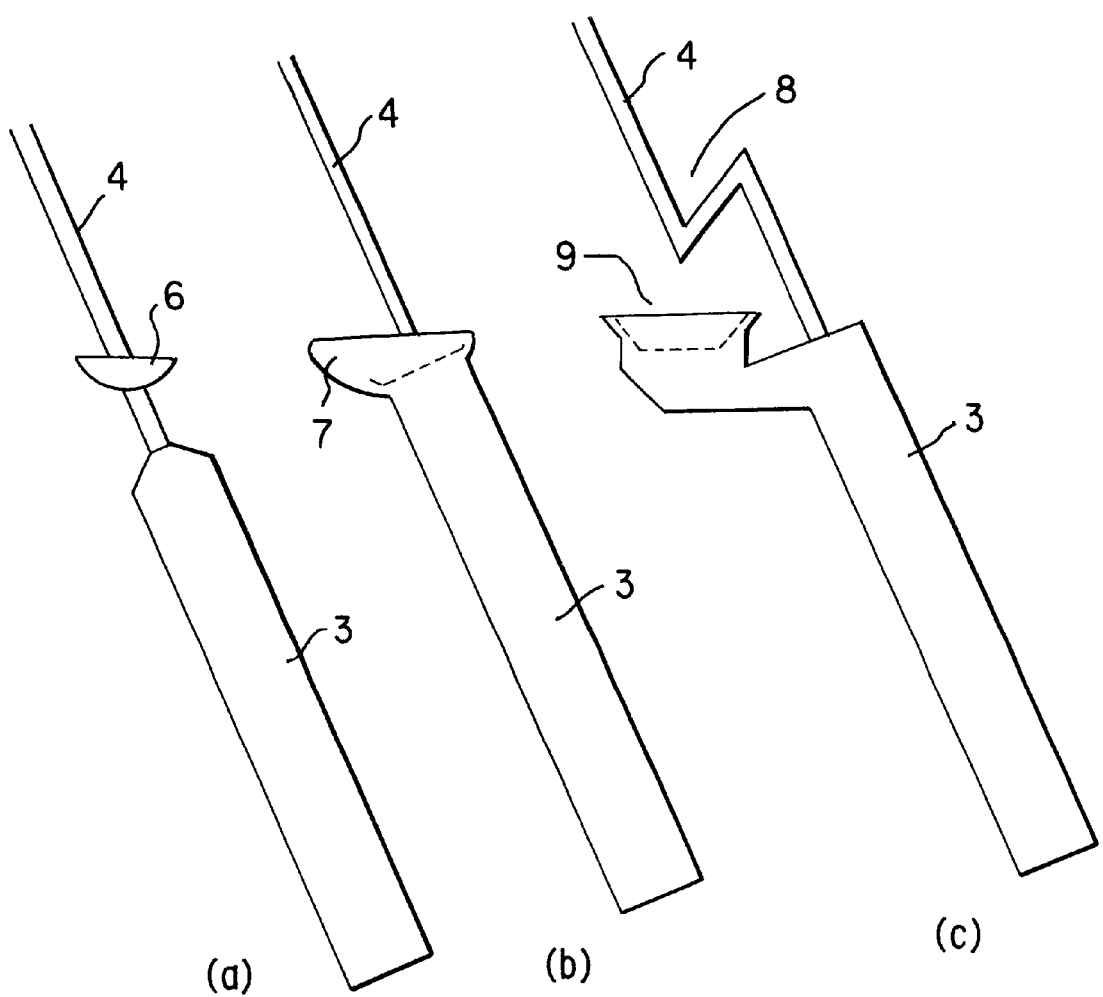
FIGS. 5(a), 5(b) and 5(c) are elevational views showing various embodiments of a liquid receiving member formed in the shank portion or grip portion of a cooking utensil according to one embodiment of the present invention.

The supporting member 5 may also be formed in such a manner that it has a prescribed angle with respect to the shank portion 4 and grip portion 3, as illustrated in FIG. 4(a), or alternatively, the supporting member 5 may be attached rotatably to the grip portion 3 in such a manner that the angle of the supporting member 5 with respect to the shank portion 4 and grip portion 3 can be adjusted freely as illustrated in FIG. 4(b). By adopting this construction, not only does it become possible to adjust the angle of the supporting member with respect to the shank portion and grip portion as appropriate, but when storing the utensil in a drawer, or the like, it can be stored whilst taking up little space, by folding up the supporting member. Moreover, if the supporting member is formed in the shape of a rabbit face, for example, then when the supporting member is folded up to store the utensil, the rabbit ear sections can be folded over the shank portion, thereby making the utensil more compact for storage. Moreover, if, for example, the supporting member is formed in the shape of a loop, then by extending the supporting member in a linear direction when storing the utensil, it is possible to store the utensil by engaging a portion of this loop with a hook.

The shape and dimensions of the supporting member 5, the angle between the supporting member and the grip portion and shank portion, and the weight of the supporting member, and the like, can be determined appropriately by experimentation, depending on the type of cooking utensil to which the present invention is applied, and the size of the head portion thereof, the length of the shank portion thereof, the weight of the head portion and the shank portion, and the like.

Moreover, in the cooking utensil according to the present invention, the grip portion may be formed independently of the shank portion and connected thereto by means of welding, bonding, or the like, or alternatively, a part of the shank portion may be used as the grip portion. For example, a grip portion made from plastic or wood may be attached to a shank portion made from metal, or alternatively, a part of a metal shank portion may be used as the grip portion. Furthermore, the head portion and shank portion of the cooking utensil may be formed independently and connected together by means of welding, bonding, or the like, or the head portion and shank portion may be formed in an integral fashion.

Incidentally, a problem arises in that, when the ladle is taken out from a pan and stood upright with the grip portion in a downward position, as illustrated in FIG. 1–FIG. 3, liquid adhering to the head portion (bowl portion) 2 flows down the shank portion 4 and wets the grip portion, and it may then flow down past the grip portion and onto the worktop, causing soiling. In the present invention, this problem is resolved by forming a liquid receiving member on the shank portion, the liquid receiving member comprising a liquid receiving section facing in the direction of the head portion. In the cooking utensils according to the present invention illustrated in FIG. 1–FIG. 3, a liquid receiving member 6 is formed on the shank portion 4. In the embodiments shown in FIG. 1–FIG. 3, the liquid receiving member 6 has a dish shape, and is formed in such a manner that, when the ladle is stood upright with the head portion turned upside-down, the opening of the dish shape is orientated in an upward direction.

By forming the liquid receiving member in this way, when the ladle is removed from a pan and stood upright invertedly, although liquid adhering to the head portion (bowl portion) 2 may flow downwards via the shank portion, since this liquid is collected in the liquid receiving member 6, the problems associated with the liquid wetting the grip portion 3 or soiling the worktop by flowing past the grip portion 3 are resolved. Moreover, when the ladle is used again, the liquid collected inside the liquid receiving member 6 may be discarded into the sink, removed with a cloth, or the like, or it may be returned to the pan by holding the ladle horizontally over the pan.

The liquid receiving member may be disposed in an intermediate position on the shank portion, for example, as shown in FIG. 1–FIG. 3 or FIG. 5(a). Alternatively, as shown in FIG. 5(b), when a grip portion 3 is formed in a part of the shank portion, it can also be formed integrally with the grip portion, at the end of the grip portion 3 on the head portion side, in such a manner that the liquid receiving section 7 is formed facing toward the head portion. Furthermore, as shown in FIG. 5(c), it is also possible to bend a section 8 of the shank portion 4 in N-shape, whilst forming a liquid receiving section 9 integrally with the grip portion and having a shape which projects from the grip portion, in such a manner that liquid flowing down the shank portion 4 drops from the bend section 8 into the liquid receiving section 9. It is deemed that such embodiments are also included in a concept that "liquid receiving member is formed on the shank portion".

Figure 6:
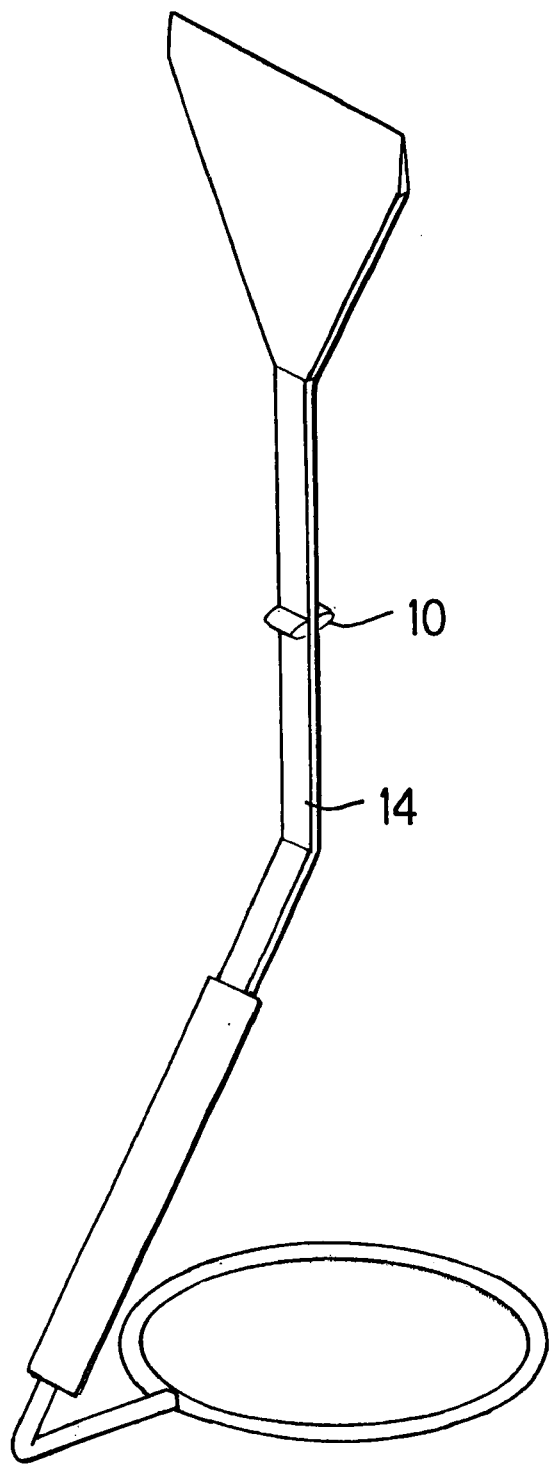
FIG. 6 is a perspective view showing an example of the construction of an invertably standable cooking utensil according to a further embodiment of the present invention.

Furthermore, as shown in FIG. 6, it is also possible to form a projection 10 on the shank portion 14 of the cooking utensil and use this as a liquid receiving member. The cooking utensil illustrated in FIG. 6 is a turner, and in cases where a turner is used and the amount of liquid adhering to the head portion is small, it is possible to provide a sufficient barrier to the downward flow of liquid from the head portion, by means of a liquid receiving member formed as a projection on the shank portion. Moreover, in a further embodiment of the present invention, it is also possible to provide a liquid receiving member on the head portion, instead of, or in addition to, on the shank portion or grip portion. Specifically, a second embodiment of the present invention relates to a cooking utensil which comprises a shank portion, a head portion, a supporting member formed at an end section of the shank portion for supporting the cooking utensil in an inverted upright state with the head portion in an upward position, and a liquid receiving member formed on the head portion for receiving liquid adhering to the head portion when the cooking utensil is stood in the inverted upright state.

The second embodiment of the present invention is described below with reference to the drawings. In the following description, for the sake of convenience a turner is used as an example of a cooking utensil.

Figure 7:
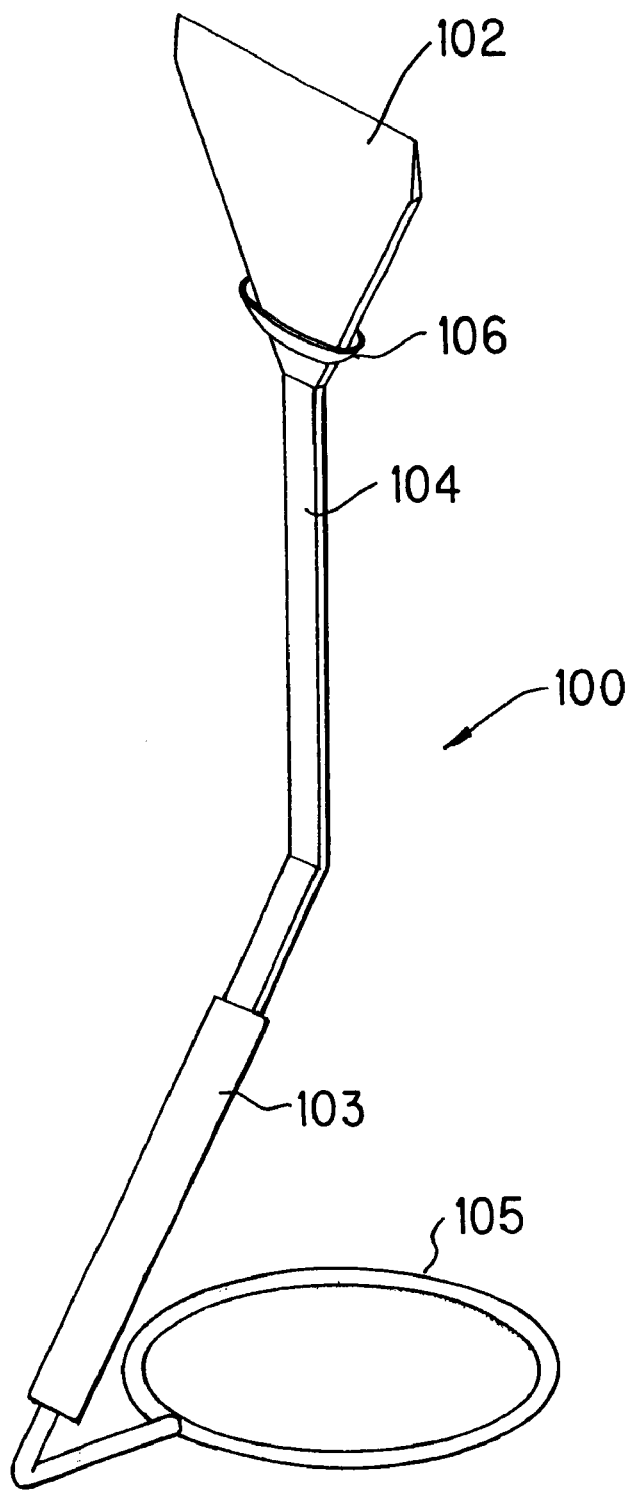
FIG. 7 is a perspective view showing an example of the construction of an invertably standable cooking utensil according to a further embodiment-of the present invention.

One example of a invertably standable cooking utensil (turner) according to the second embodiment of the present invention is illustrated in FIG. 7.

The turner 100 shown in FIG. 7 comprises: a head portion 102 for stirring food, when stir-frying vegetables, for instance, or turning food over, when cooking fried food, for instance; a shank portion 104; and a supporting member 105 connecting to the end of the shank portion. A grip portion 103 is formed in a part of a shank portion (opposite side to the head portion). The head portion 102 is divided into a front end section and a rear end section, and the shank portion 104 is fixed to the rear end section of the head portion 102. A liquid receiving member 106 having a receiving section which opens in an upward direction when the turner is stood in an inverted upright position is attached to the head portion 102. In the state illustrated in FIG. 7, the liquid receiving member 106 has a dish shape.

Figure 8:
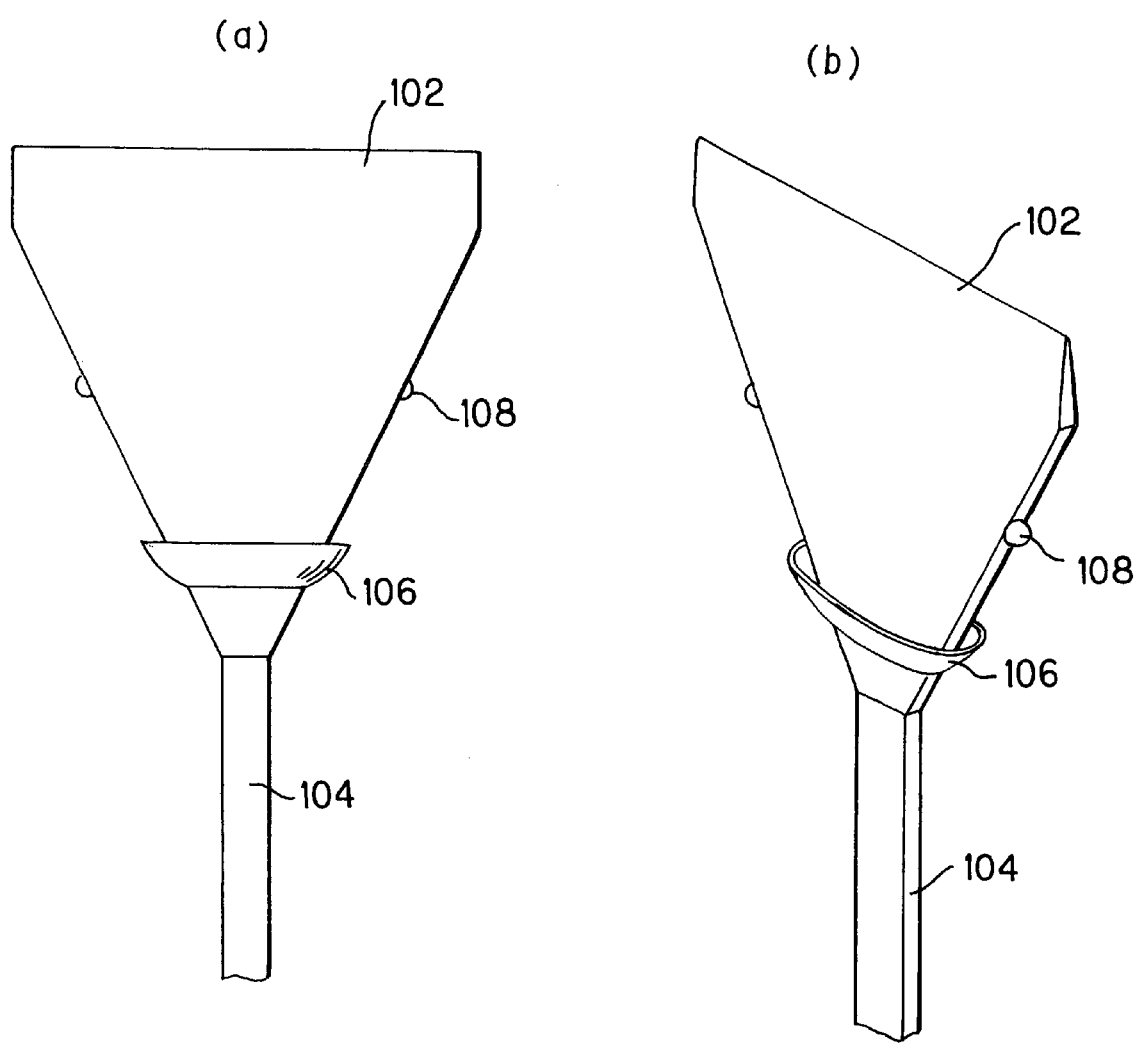

When the turner 100 illustrated in FIG. 7 is not being used, it can be stood in an approximately upright inverted position, with the supporting member 105 lying flat on a horizontal surface such as a worktop. When the turner 100 is stood in this approximate upright inverted position after being used to stir food, or the like, any liquid, such as oil, water, or the like, adhering to the head portion 102, flows downwards along the surfaces of the head portion 102, but it is stopped by the liquid receiving member 106 attached to the rear end section of the head portion 102 (see FIG. 8, which is an enlarged view of the head portion and a liquid receiving member of the cooking utensil in FIG. 7). This prevents any soiling of the grip portion 103 or worktop by liquid flowing down from the head portion. When the turner stood in an inverted position is to be used again, it is held with the head portion remaining in an upward position, and then turned so that the head portion is in a downward position, once it is over the frying pan. By adopting this method, liquid, such as oil, or the like, collected in the liquid receiving member 106 flows down from the liquid receiving member 106 to the head portion 102 and then flows further downwards via the head portion 102, thereby preventing the liquid from dripping onto the worktop, burner surface, or the like. In the cooking utensil according to the present invention, a projection 108 may be formed on the rim of the head portion 102, as illustrated in FIG. 8. By forming such a projection, the liquid flowing down via the head portion when the cooking utensil is reused is caused to drop off from the projection 108, and hence the liquid can be controlled readily.

The liquid receiving member formed on the head portion may have a dish shape, as illustrated in FIG. 7 and FIG. 8.

Figure 9:
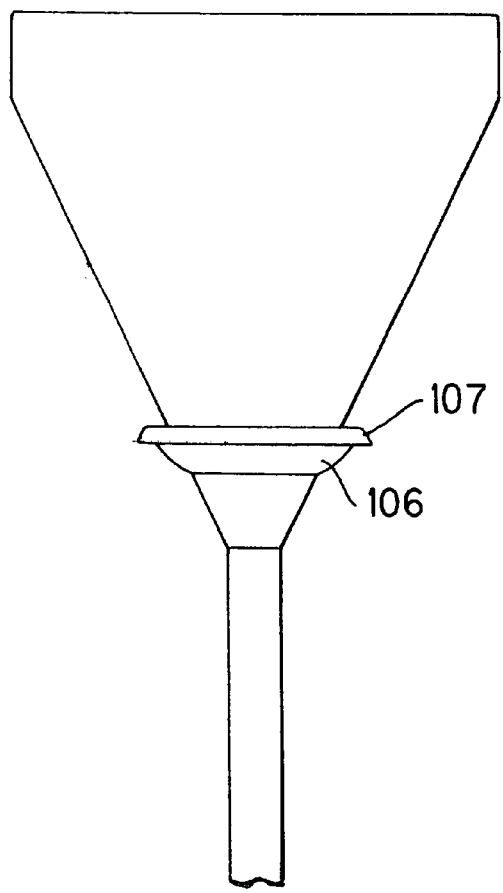
Figure 9:
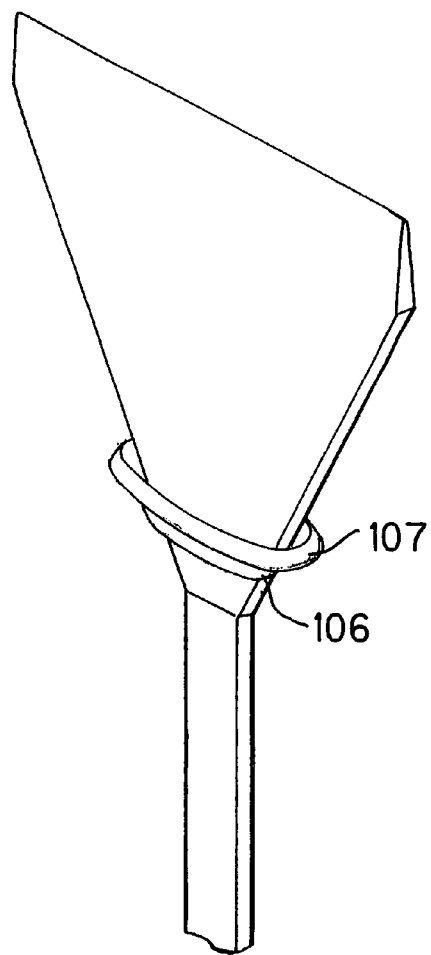

Furthermore, as illustrated in FIG. 9, the upper rim section 107 of the liquid receiving member 106 may also be bent or curved in an outward direction. If the liquid receiving member is dish shaped as shown in FIG. 7 or FIG. 8, then when the turner is stood in an inverted upright position and the liquid, such as oil, or the like, is held in the liquid receiving member, whereupon the turner is then reused, the head portion is turned to a downward position over the frying pan, as described previously, thereby returning the liquid held by the liquid receiving member to the frying pan. However, when the liquid drops down from the dish shaped liquid receiving member, there often may be soiling of the outer side of the dish shape of the liquid receiving member, due to liquid flowing around the rim of the dish shape and onto the outer surface thereof. Any liquid adhering to the outer side of the dish shape of the liquid receiving member may possibly flow downwards when the turner is inverted once again, thereby causing soiling of the worktop, grip portion, or the like, and hence this is undesirable. However, if the upper end of the rim section of the liquid receiving member is bent or curved in an outward direction as illustrated in FIG. 9, then the liquid is prevented from flowing around the rim of the dish shape and onto the outer surfaces thereof. Moreover, when the liquid flows down from the liquid receiving member also, in cases where the liquid receiving member has a dish shape as illustrated in FIG. 6 or FIG. 7, the flow of liquid is difficult to control since the liquid may drop from any plurality of points on the rim of the saucer, but if the shape illustrated in FIG. 9 is adopted, then the liquid is more readily held in the brim-shaped section 107 formed by the bent or curved section, and hence when the liquid drops downwards, it tends to drop from a single point, due to the mutual attraction within the liquid caused by surface tension.

Consequently, a merit that the liquid becomes easier to control is obtained.

Figure 10:
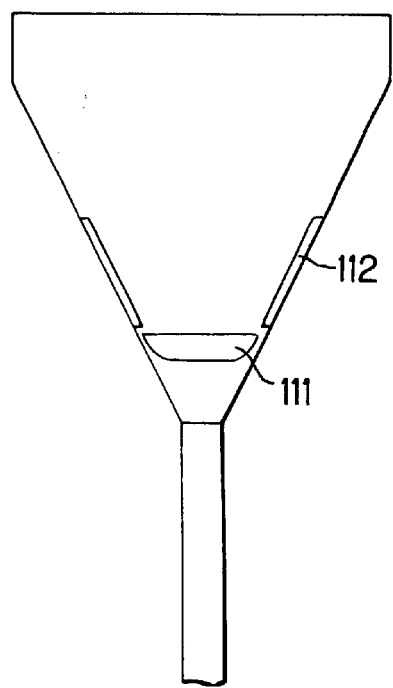
Figure 10:
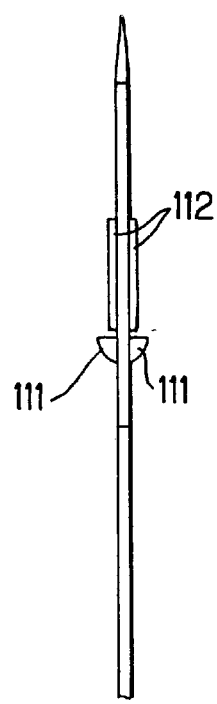
Figure 10:
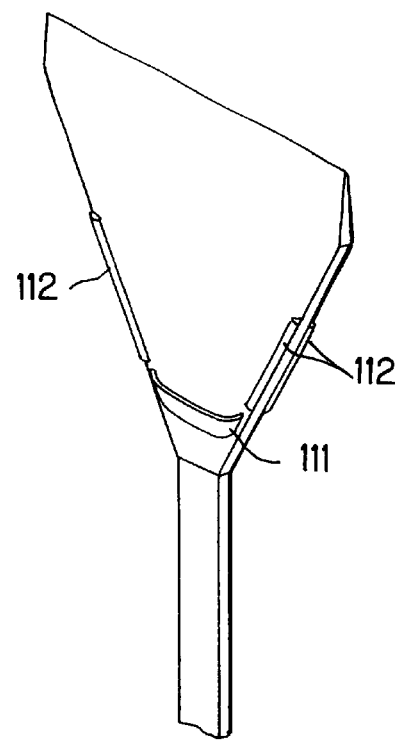
Figure 11:
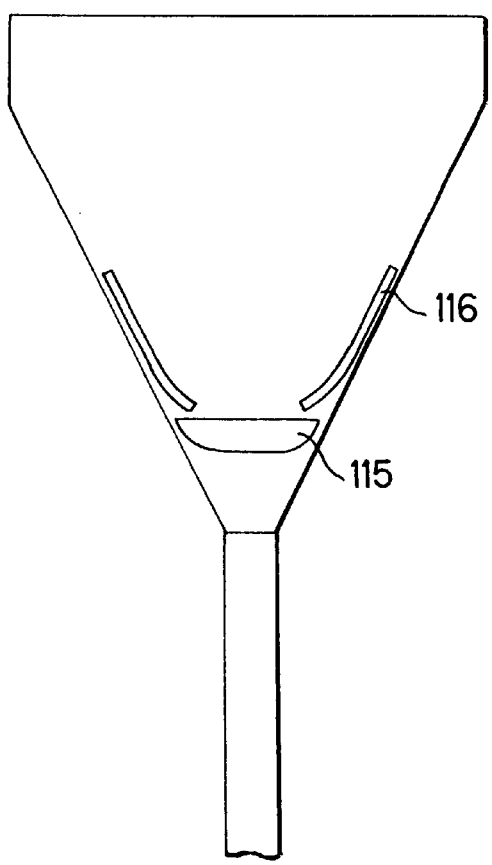
Figure 11:
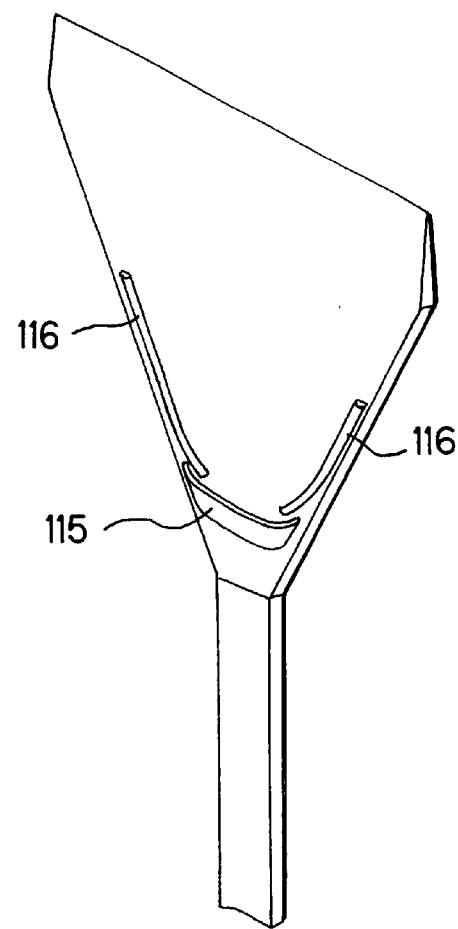

In the cooking utensil according to the second embodiment of the present invention, the liquid receiving member formed on the head portion may be a member formed around the circumference of the head portion of the cooking utensil, as illustrated in FIG. 7–FIG. 9, or alternatively, it may be constituted by forming a semicircular saucer 111, for instance, on either both sides or one side of the head portion of the cooking utensil, as illustrated in FIG. 10. In other words, in this case, it is possible to avoid disposing the liquid receiving member on the side edges of the head portion. Moreover, as shown in FIG. 10 also, it is possible to form a liquid guiding member 112 along the perimeter of the head portion of the cooking utensil. As shown in FIG. 10, the liquid guiding member 112 may, for example, be constituted by projections extending along the edges of the head portion of the cooking utensil. If a liquid guiding member 112 is provided in this way, then particularly in the position illustrated in FIG. 10, where the liquid receiving member 111 is formed on either side of the head portion of the cooking utensil (in other words, a state where the liquid receiving member is not disposed on the side.edges of the head portion), then it is possible to guide the oil, or other such liquid, dropping down along the head portion, into the liquid receiving member 111 in a reliable fashion. Moreover, when a liquid guiding member is provided, then if the rear end sections of the liquid guiding member 116 (in other words, the end sections on the side adjacent to the liquid receiving member 115) are curved in an inward direction, as illustrated in FIG. 11, it is possible to guide the liquid into the liquid receiving member 115 in an even more reliable fashion.

Figure 12:
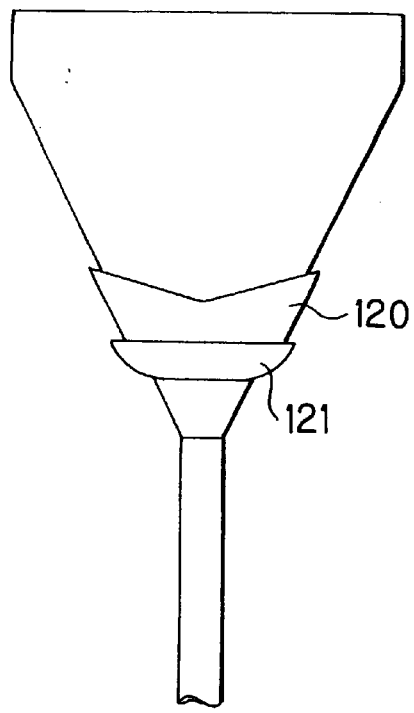
Figure 12:
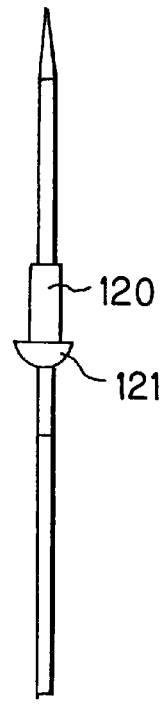
Figure 12:
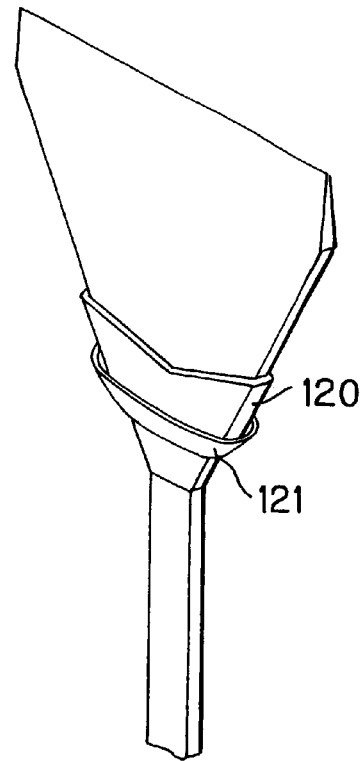

Moreover, in a further embodiment, by forming the rear end section 120 of the head portion of the cooking utensil so that it is thicker than the front end section thereof, as illustrated in FIG. 12, and bending the central part of the edge thereof to form a V-shape, as illustrated in FIG. 12, then the liquid, such as oil, or the like, flowing downwards along the surfaces of the head portion, will flow along the edge and into the central portion thereof at the rear end section 120 of the head portion, and will then flow downwards from the central apex point of the V-shape, thereby making it possible to guide the liquid towards the liquid receiving member 121 in a reliable fashion. In this case, it is also possible to adopt a U-shape instead of a V-shape.

Figure 13:
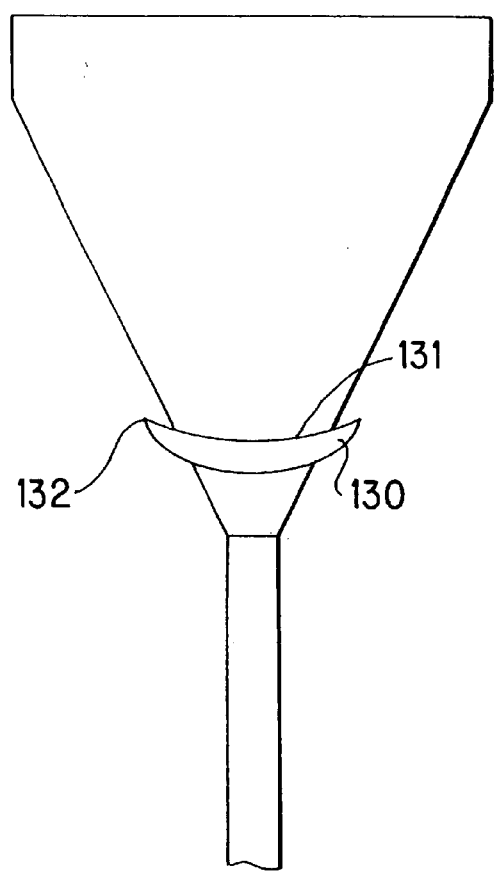
Figure 13:
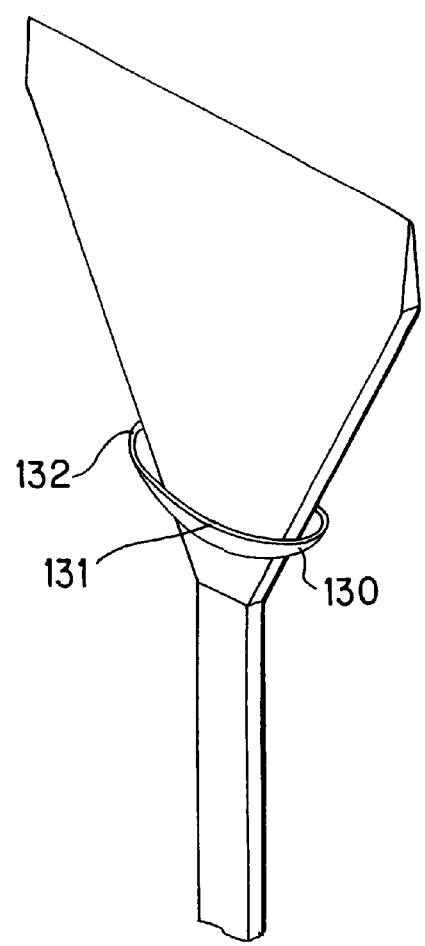

Moreover, as illustrated in FIG. 13, it is also possible to constitute liquid receiving member 130 wherein the perimeter of the liquid receiving member 130 is curved in such a manner that the edge 131 of the centre portion of the liquid receiving member 130 is situated below the edges 132 at either end thereof, when the cooking utensil is in an inverted upright position. By adopting this construction, when the cooking utensil is stood in an inverted position, and liquid is held in the liquid receiving member 130, whereupon the cooking utensil is then reused, the liquid held in the liquid receiving member 130 is caused to flow down via either end section 132 of the liquid receiving member 130, thereby making it simple to control the liquid.

Figure 14:
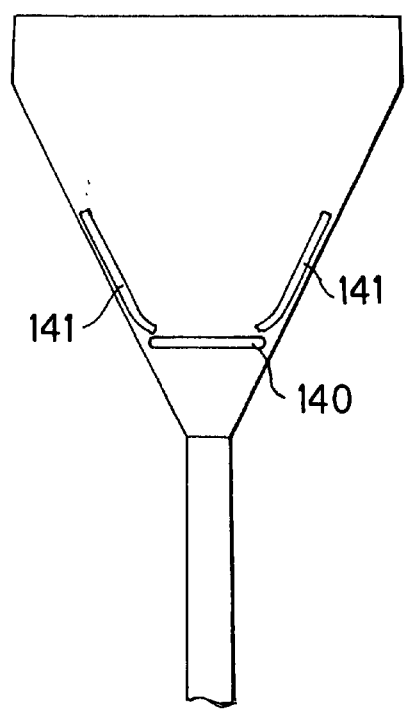
Figure 14:
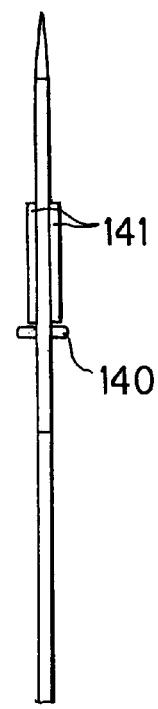
Figure 14:
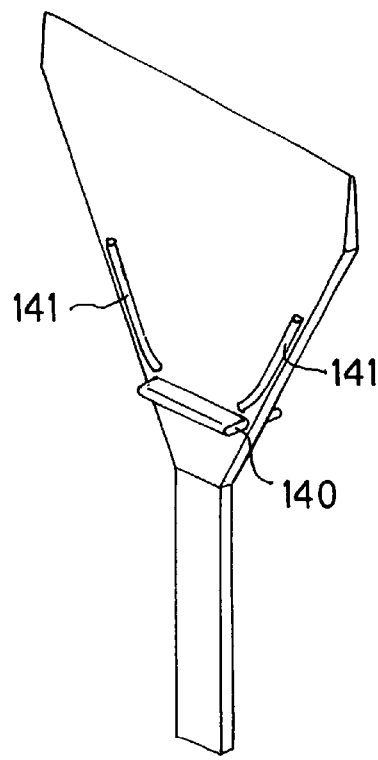

Moreover, with regard to the shape of the liquid receiving member formed in the head portion of the cooking utensil, in addition to a dish shape as illustrated in FIG. 7–FIG. 13, it is also possible to constitute a liquid receiving member by forming a projection 140 extending in a horizontal direction on the head portion of the cooking utensil, as illustrated in FIG. 14. In the case of a cooking utensil such as the turner illustrated in FIG. 14, or the like, after stirring food, or the like, a considerable amount of the liquid, such as oil, or the like, adhering to the surface of the head portion can be caused to drop off by turning the turner lightly over the frying pan, and therefore in such cases, it is possible to hold the majority of the liquid in the liquid receiving member 140 simply by forming a liquid receiving member 140 by a projection extending in the horizontal direction, rather than providing a dish shaped liquid receiving member. Moreover, in this embodiment also, according to need, it is possible to form a liquid guiding member 141 along the edges of the head portion of the cooking utensil, in such a manner that the flow of liquid down the surface of the head portion is guided to the liquid receiving member 140 in a reliable manner.

With regard to the position where the liquid receiving member is formed, it is desirable if it is installed in the rear end section of the head portion (in other words, the section of the head portion adjacent to the part where the head portion is connected to the shank portion), but it is also possible, for example, to form it in the vicinity of the central region of the head portion. Alternatively, it is also possible to form a liquid receiving member respectively in both the vicinity of the central region of the head portion and the rear end section thereof.

Figure 15:
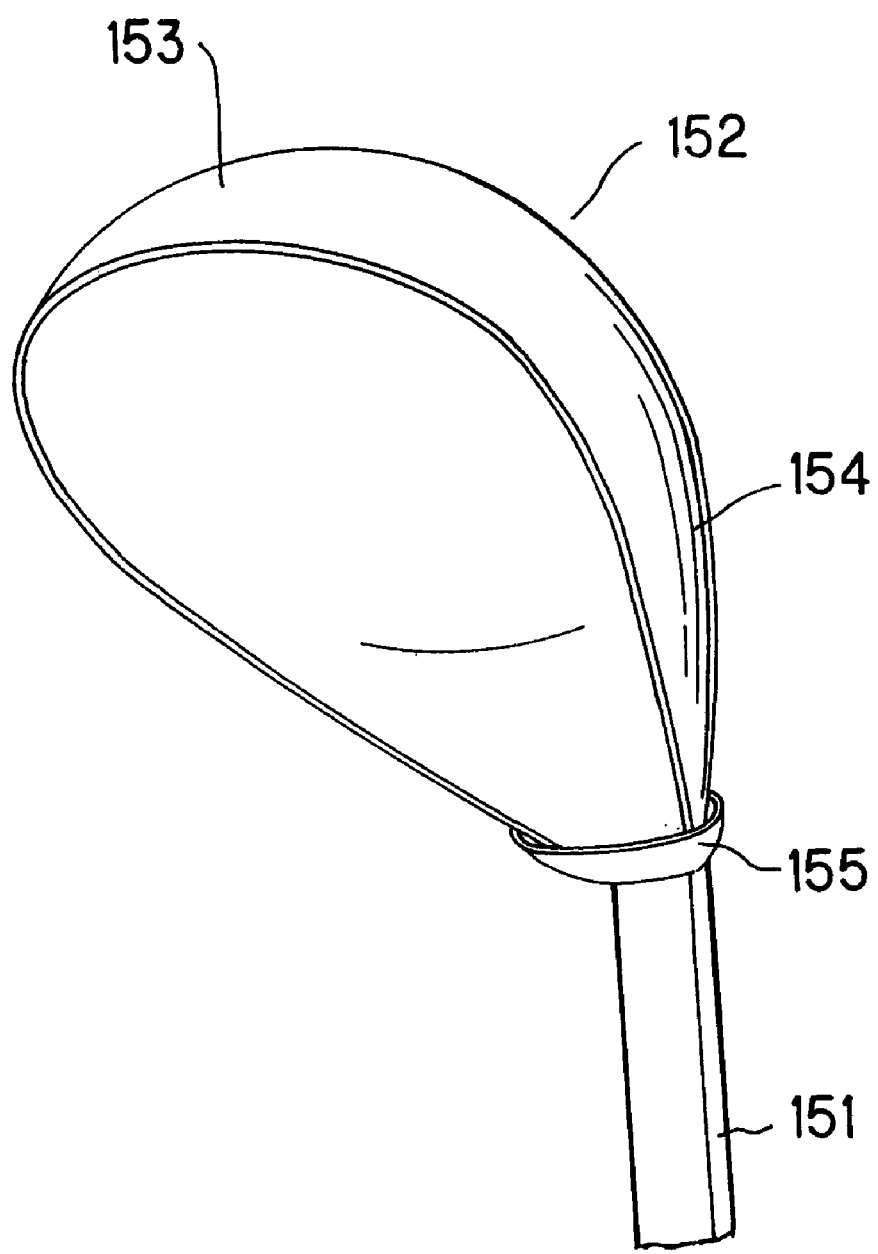
FIG. 15 is an enlarged perspective view showing a head portion and liquid receiving member in an invertably standable cooking utensil according to a further embodiment of the present invention.

The foregoing description is related to a turner as an example of a cooking utensil according to the second embodiment of the present invention, but the cooking utensil according to the second embodiment of the present invention may also be a bowl-shaped utensil, such as a ladle. FIG. 15 shows one example where the technical innovation of the present invention is applied to a bowl-shaped utensil.

In the cooking utensil illustrated in FIG. 15, a bowl portion 152 is attached to one end of a shank portion 151. The bowl portion 152 has a concave shape for scooping up soup, and the like. The bowl portion comprises a front end section 153 and a rear end section 154, the shank portion 151 being affixed to the edge of the rear end section 154 of the bowl portion, and a liquid receiving member 155 being attached to the rear end section of the bowl portion. Moreover, in a bowl-shaped cooking utensil having a bowl portion of this shape, instead of providing a dish shaped member 155 as illustrated in FIG. 15 for the liquid receiving member formed on the head portion of the cooking utensil, it is also possible to form a member 157 for preventing the flow of liquid when the ladle is in an inverted upright position, in the rear end section 154 of the bowl portion 152, as shown in FIG. 16, for example, this member serving as a liquid receiving member.

Figure 17:
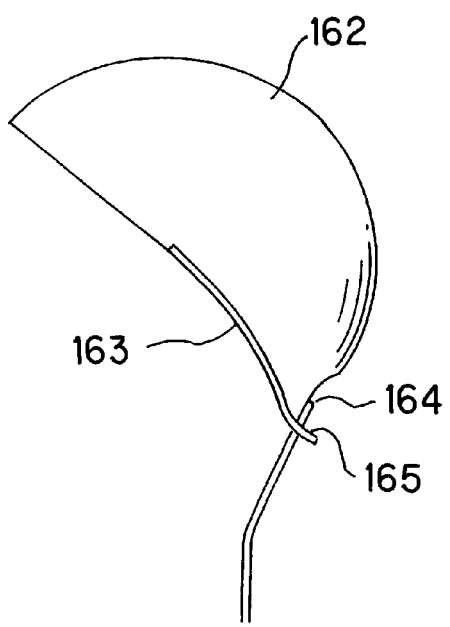
Figure 17:
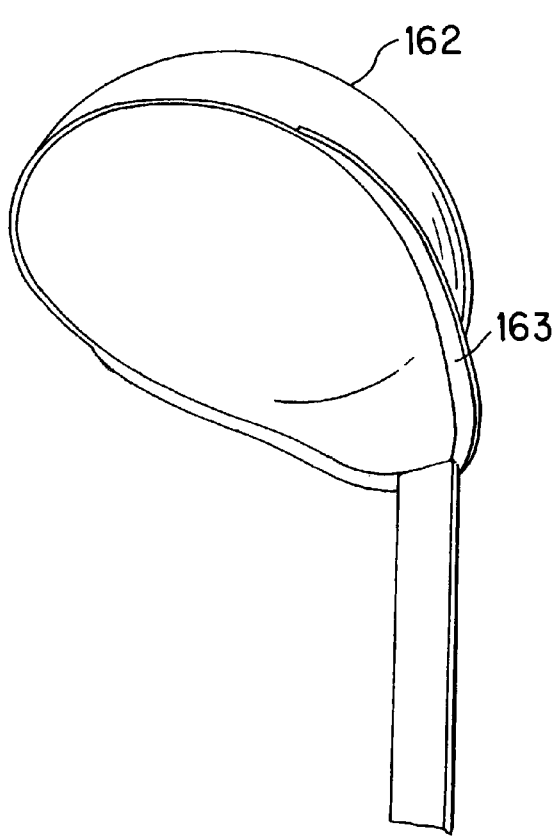

Moreover, it is also possible to adopt a construction for a cooking utensil such as that illustrated in FIG. 17. In the cooking utensil shown in FIG. 17, liquid leading means 163 in the shape of a brim extending in an outward direction is formed on the circumference of the rear end section of the bowl portion 162. The surface 164 of the rear end section of the bowl portion in the vicinity of its point of attachment to the shank portion is formed into a recess, by means of pressing, or the like, in such a manner that the liquid leading means 165 extends into this recess portion, thereby allowing the brim-shaped liquid leading means to be provided on the rear face of the bowl portion also. By adopting this composition, the liquid adhering to the outer surface of the bowl portion flows downwards along the outer surface of the bowl portion when the cooking utensil is stood in an inverted state, and a part thereof is guided in the direction of the shank portion attachment region by the liquid leading means 163 and ultimately, it is held by the liquid leading means 165 formed in the vicinity of the region where the shank portion is attached. Consequently, the rearmost end section 165 of the liquid leading means functions as a liquid receiving member.

Figure 16:
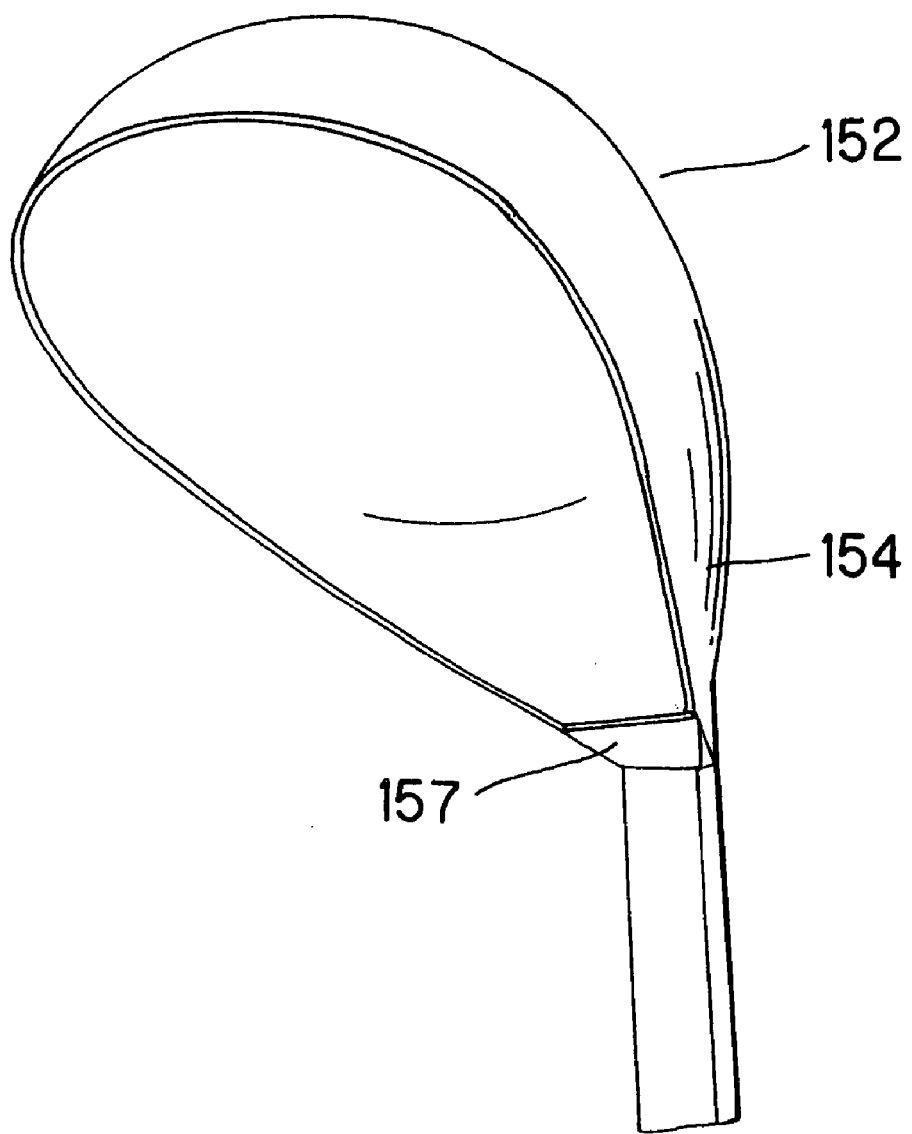
FIG. 16 is an enlarged perspective view showing a head portion and liquid receiving member in an invertably standable cooking utensil according to a further embodiment of the present invention.

In the embodiment shown in FIG. 16, it is possible to form liquid leading means similar to that illustrated in FIG. 17 at the edge of the bowl portion in the vicinity of the point where a liquid receiving member 157 is attached, as well as to form liquid leading means (as illustrated in FIG. 17) extending to the rear face of the bowl portion also. By adopting this construction, a liquid receiving member are formed on both the inner surface and the rear surface of the recess section of the bowl portion.

Figure 18:
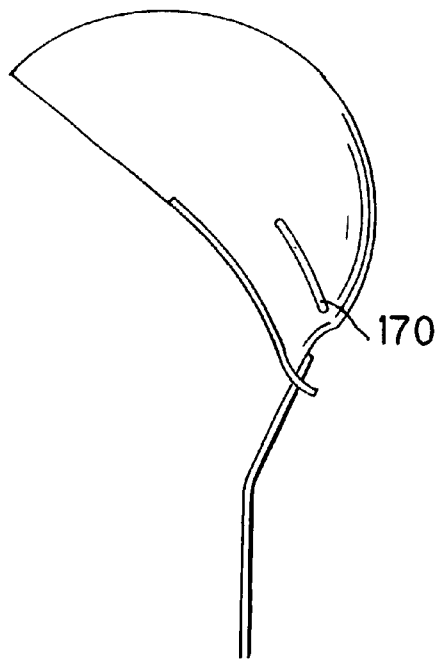
Figure 18:
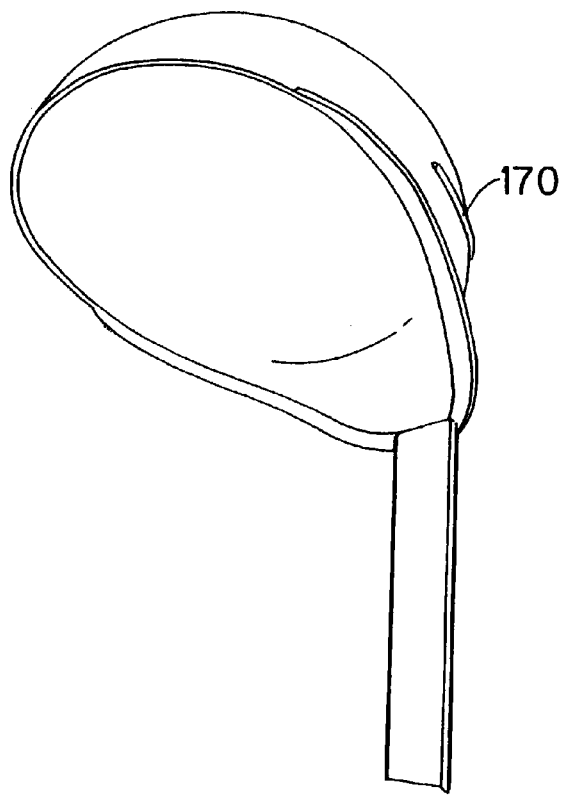

In the embodiment illustrated in FIG. 17, it is also possible to form a liquid guiding member 170 extending along the edges of the bowl portion on the outer surface of the rear end section of the bowl portion, as illustrated in FIG. 18. For example, the liquid guiding member 170 can be constituted by forming projections extending along the edges of the rear end section on the outer surface of the rear end section of the bowl portion, by means of embossing, or the like.

In the cooking utensil according to the present invention, the angle between the head portion and the shank portion, and between the supporting member and the shank portion can be set to optimum angles with respect to the shape, size, and the like of the head portion, whilst taking into account the balance of the cooking utensil when stood in an inverted position, and ease of picking it up and turning it when it is to be used, and the like. Moreover, the shank portion may also be curved or bent along its length, as well as having a linear shape. However, in the case of the ladle, being a cooking utensil having a bowl portion, as illustrated in FIG. 1, it is necessary that when the ladle is stood in an inverted position, the rim of the bowl portion is disposed in such a manner that it is inclined downwards towards the shank portion. By situating the bowl portion in this manner, any liquid adhering to the inner and outer surfaces of the bowl portion when the ladle is stood in an inverted position will flow down towards the shank portion and be held by the liquid receiving member.

Figure 19:
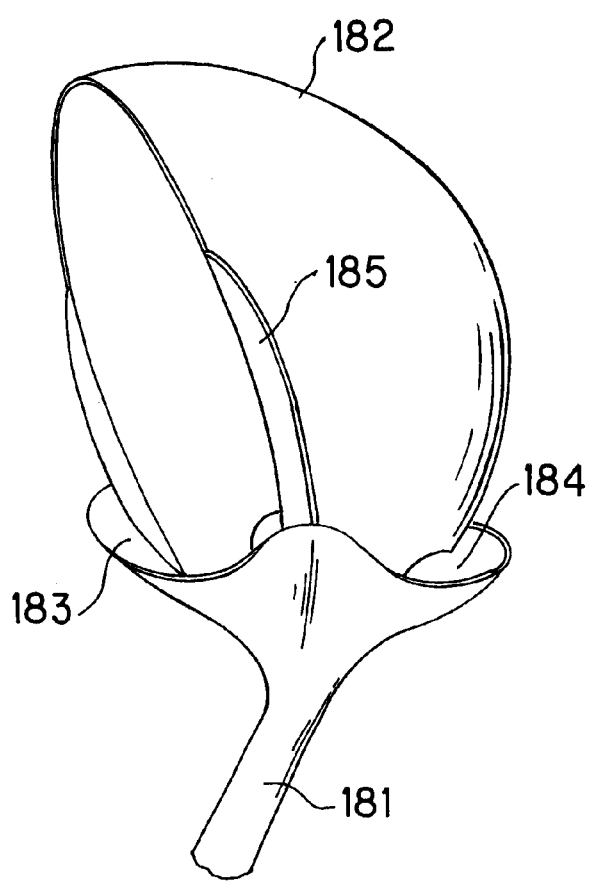
Figure 19:
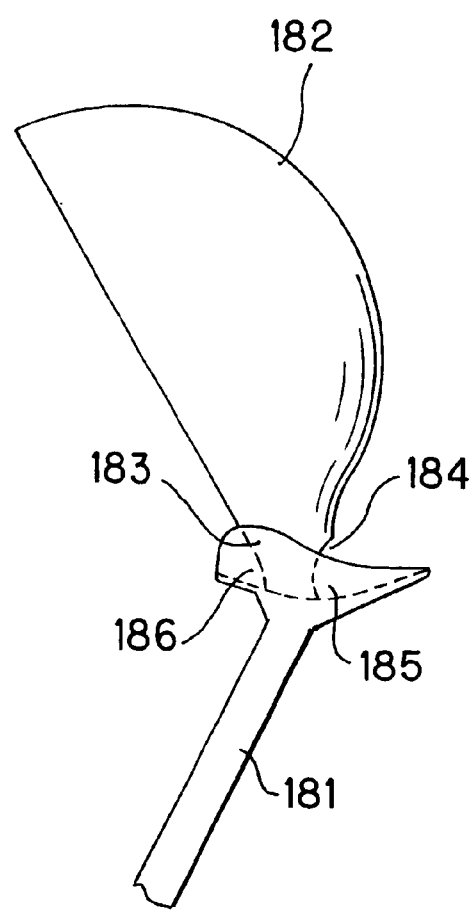

Moreover, in the cooking utensil according to the second embodiment of the present invention, it is possible to provide an opening in the head portion. FIG. 19 shows a cooking utensil (ladle) according to this embodiment. FIG. 19(*a*) is an enlarged perspective view of the head portion (bowl portion) of a cooking utensil and FIG. 19(*b*) is a side view of same. The cooking utensil illustrated in FIG. 19 comprises a shank portion 181 and a bowl portion 182 attached to one end of said shank portion. Dish shaped liquid receiving member 183 is formed in the connection region between the shank portion 181 and the bowl portion 182. An-opening-184 is formed in a part of the bowl portion 182. In the state illustrated in FIG. 19, the opening 184 is formed in such a manner that the liquid receiving member 183 is tangent to the opening. By forming such an opening 184, when the ladle is stood in an inverted position after use, the liquid adhering to the bowl portion flows downwards and collects inside the liquid receiving member 183, but in so doing, the liquid flowing down the rear face 185 flows through the opening 184 to the front face 186. Consequently, when the ladle is used again, the liquid collected on the liquid receiving member should be shaken off the ladle from the front face 186 thereof. If the opening 184 is not formed in this way, then when the liquid collected in the liquid receiving member is shaken off, the liquid collected on the rear surface may be scattered off, whereas if the opening 184 is formed, then the liquid can be controlled in an extremely simple manner. The foregoing description relates to a situation where liquid received by a liquid receiving member 183 is caused to flow from the rear side of the cooking utensil to the front side thereof, but it is also possible to adopt a similar construction wherein the liquid held by the liquid receiving member 183 is caused to flow from the front side 186 of the cooking utensil to the rear side 185 thereof. In this case, the liquid collected in the liquid receiving member 183 is shaken off the ladle from the rear side of the head portion of the cooking utensil when it is used.

In the case where the cooking utensil is a ladle such as that illustrated in FIG. 19, the position in which the opening is formed must be set in a position which does not adversely affect the ladling action of the utensil, in other words, in the vicinity of the connecting portion between the shank portion and the bowl portion.

Figure 20:
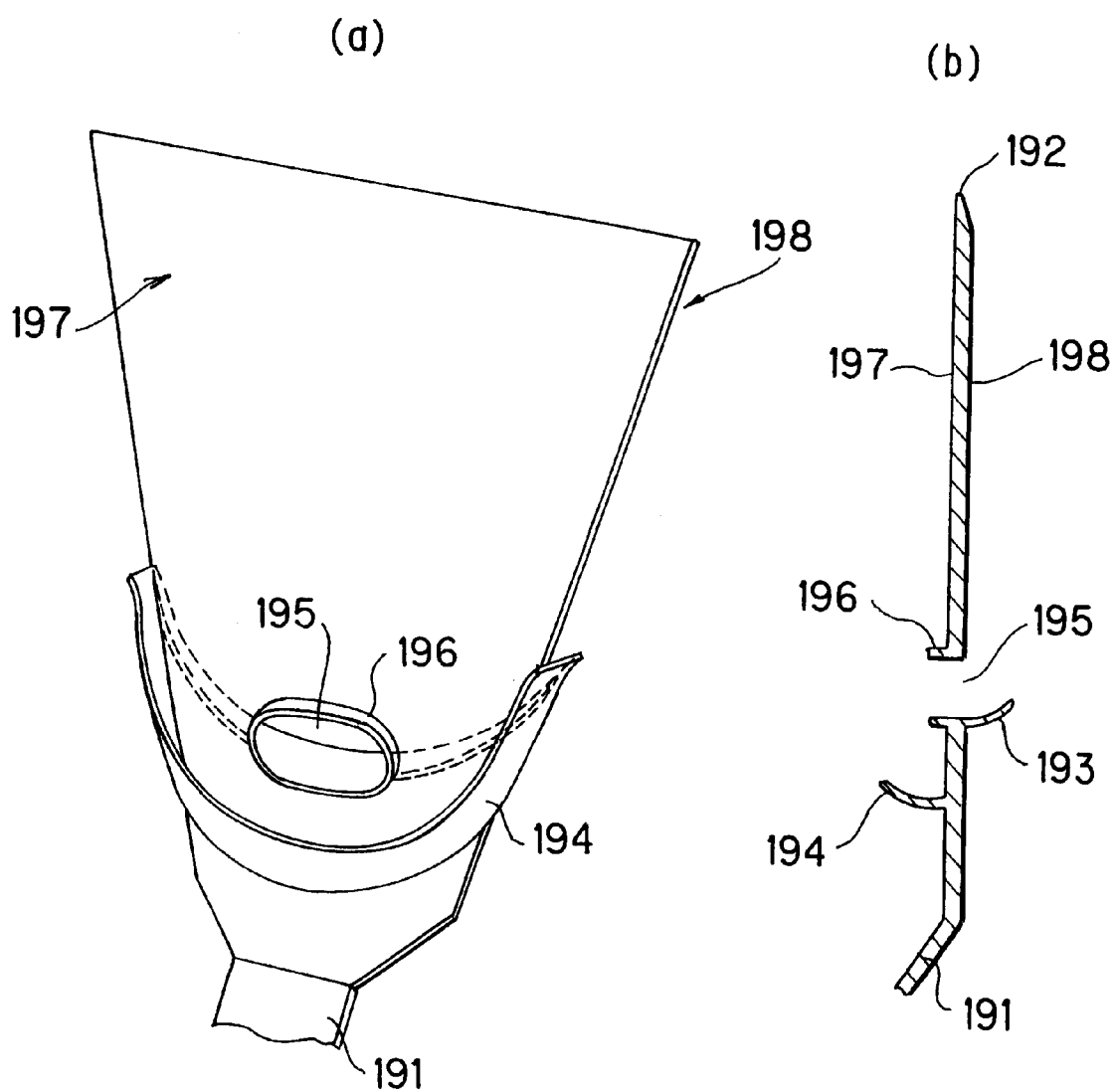

Moreover, it is also possible to adopt a structure wherein liquid flowing downwards when the cooking utensil is stood in an inverted position after use is guided to one side of the cooking utensil by a combination of an opening in the head portion and the composition of a liquid receiving member. FIG. 20 shows a cooking utensil (turner) having such a structure. The cooking utensil (turner) in the embodiment illustrated in FIG. 19 comprises a shank portion 191 and a head portion 192 attached to one end of the aforementioned shank portion. An opening 195 is formed in the head portion 192, first liquid receiving member 193 disposed such that the opening is tangent to the first liquid member 193 being formed on a first surface 198, and second liquid receiving member 194 disposed below the opening when the cooking utensil is stood upright with the head portion in an upward position being formed on a second surface 197. Additionally, a projection 196 is formed along the edge of the opening on the second surface.

A turner of this construction is used with the second surface being placed in an upward position (front surface). When the turner is stood in an inverted state after use, a the liquid adhering to both surfaces of the head portion flows downwards across the surfaces of the head portion. The liquid flowing across the first surface (rear surface) is received by the first liquid receiving member 193 and guided via the opening 195 to the second surface (front surface), where it is received by the second liquid receiving member 194 formed on the second surface. Accordingly, all liquid adhering to the head portion 192 is received by the second liquid receiving member 194. By adopting such a construction, when the turner is reused while the second surface is held in an upward position, the liquid collected by the second liquid receiving member 194 flows down across the second face of the head portion, whereby the liquid is prevented from being scattered. If a construction is adopted where liquid is also collected on the rear surface of the turner, then there is a risk that when the utensil is used again, liquid flowing down the rear face will drip off and be scattered. However, by adopting the construction described above, it is possible to prevent such dripping. Moreover, by providing a projection 196 along the opening on the second surface, it is possible to prevent liquid from flowing through the opening and onto the rear surface when the utensil is used again. Desirably, the first liquid receiving member 193 is curved or bent in such a manner that the centre portion thereof is in the lowermost position when the cooking utensil is held in an inverted state.

Figure 21:
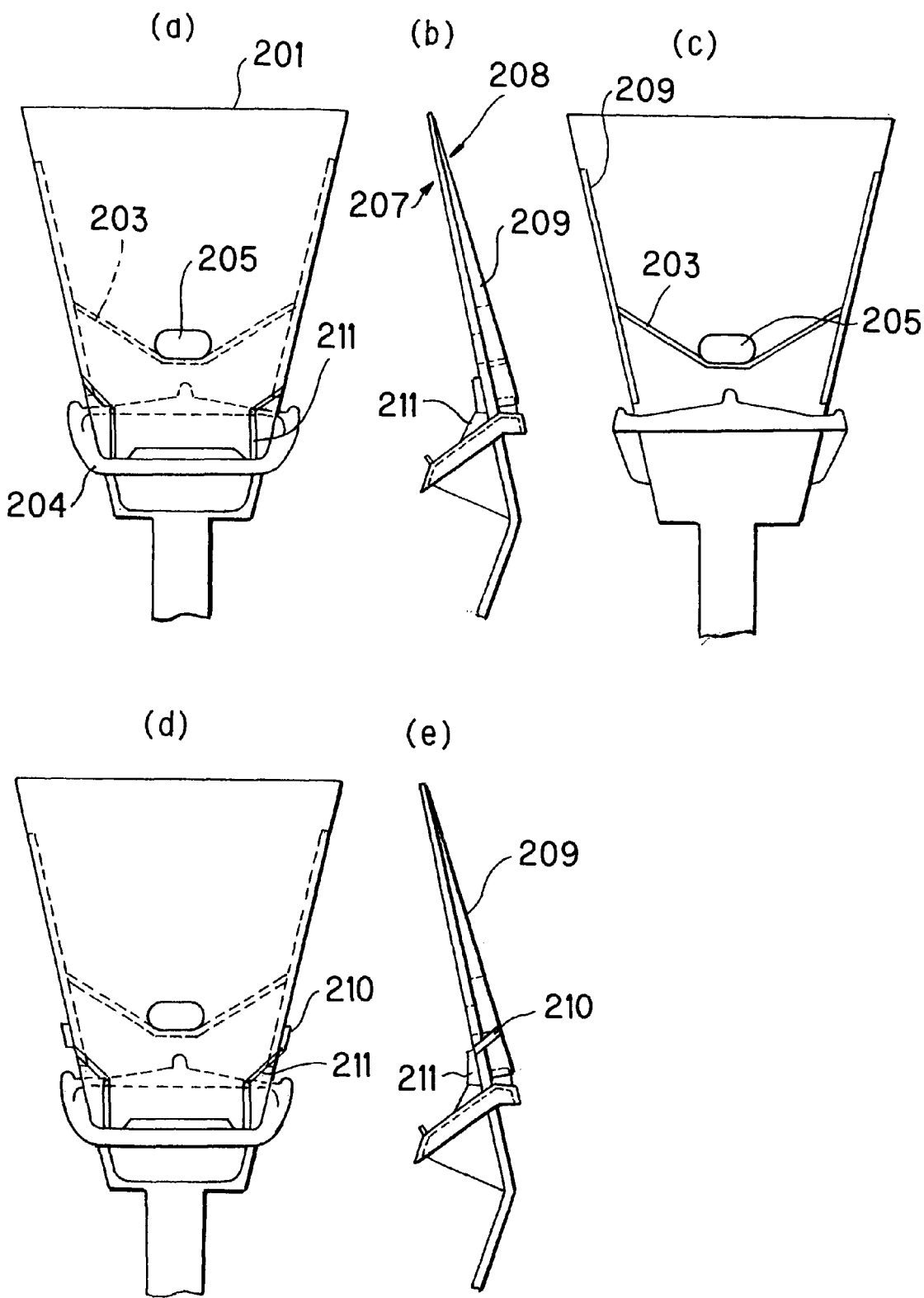
Figure 22:
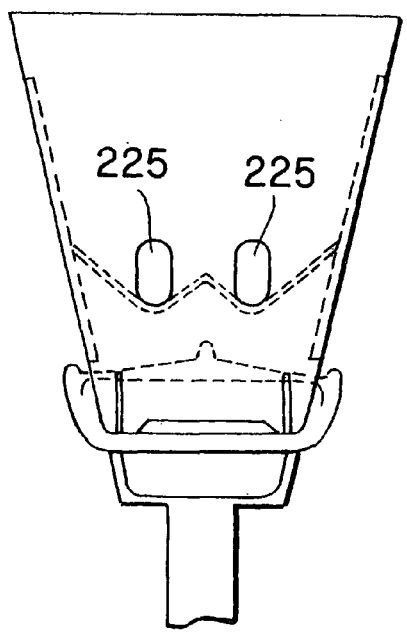
Figure 22:
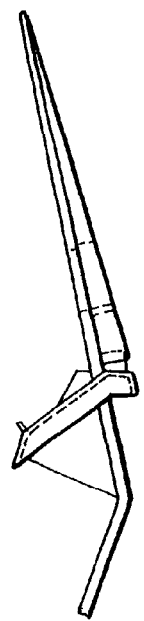
Figure 22:
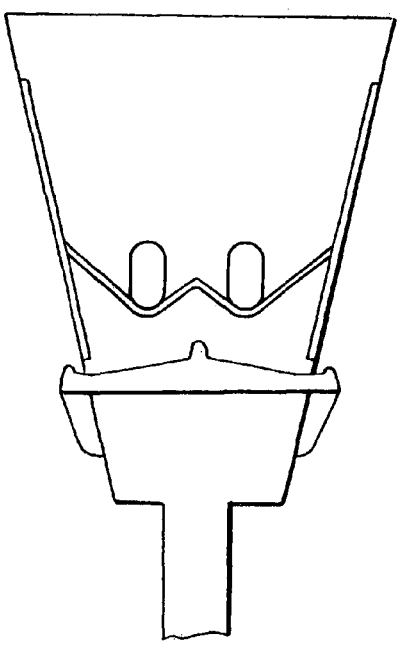
Figure 22:
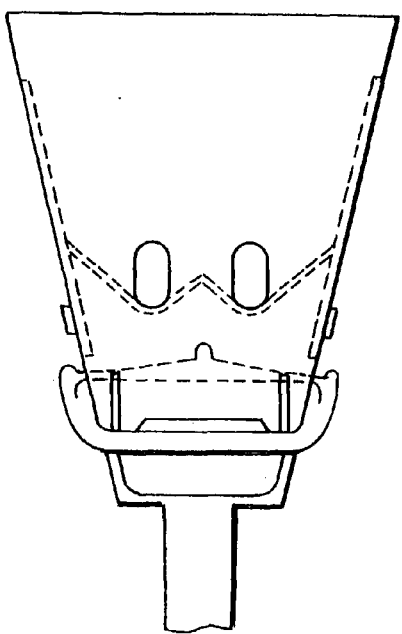
Figure 22:
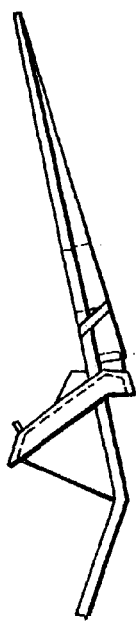
Figure 23:
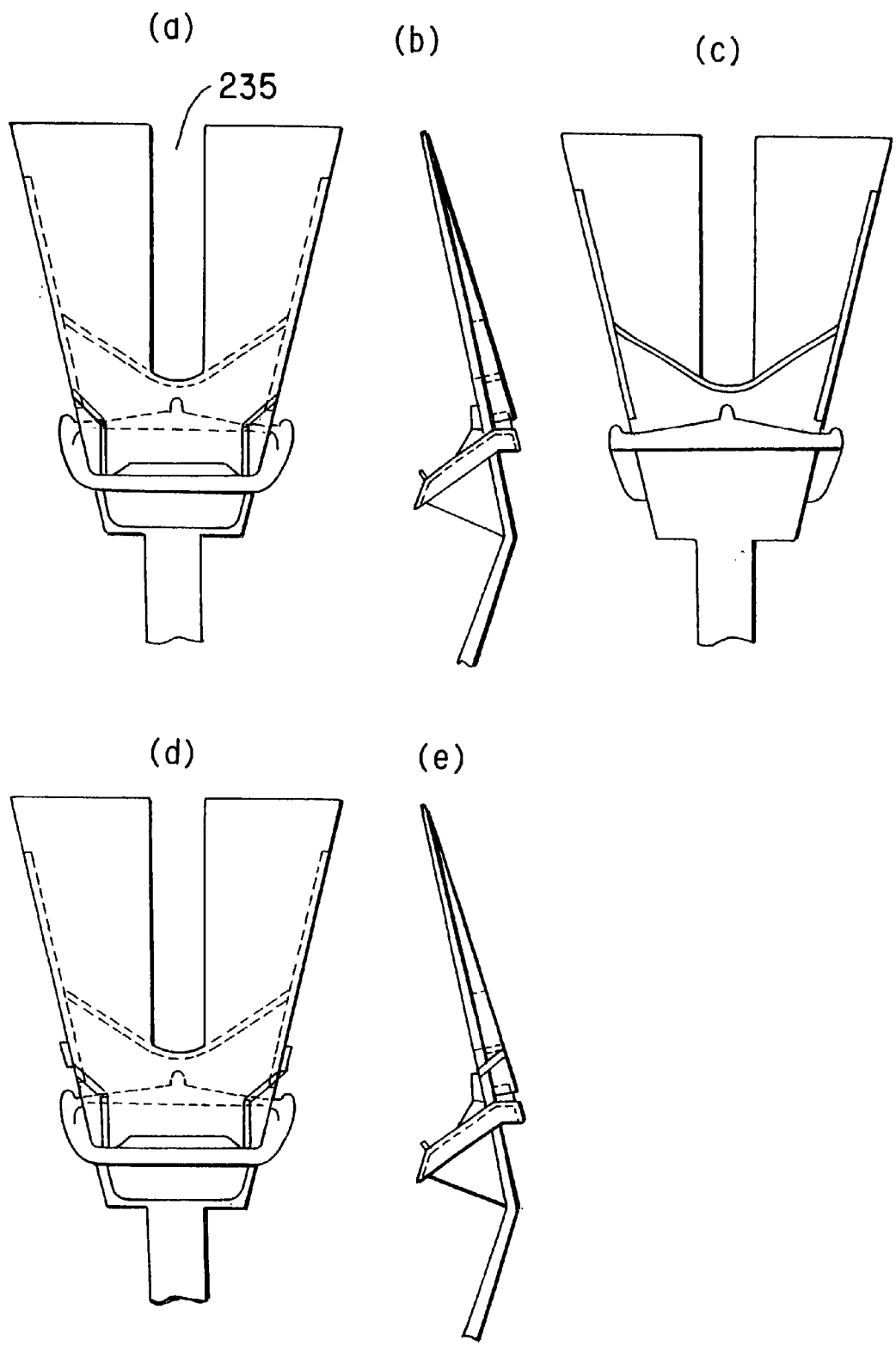

FIG. 21 shows a cooking utensil (turner) according to a further embodiment of the technical innovation illustrated in FIG. 20. FIG. 21(*a*) is a front view of a head portion and shank portion; FIG. 21(*b*) is a side view of same, FIG. 21(*c*) is a rear view of same, FIG. 21(*d*) is a front view of a cooking utensil according to a further embodiment, and FIG. 21(*e*) is a side view of same. In the turner illustrated in FIG. 21, in addition to providing an opening 205 in the head portion 201, a first liquid receiving member 203 formed in tangent to the opening 205 is provided in a first surface 208 of the head portion. A second liquid receiving member 204 is provided in a position below the opening when the cooking utensil is stood in an inverted upright state with the head portion in an upward position. In the turner according to the embodiment illustrated in FIG. 21, the second liquid receiving member 204 is disposed about the perimeter of the head portion in such a manner that the edge thereof runs completely around the head portion. Similarly to the turner according to the embodiment illustrated in FIG. 20, if this turner is stood in an inverted position after use, then liquid adhering to either face of the head portion will flow downwards across the front surface 207 of the head portion. The liquid flowing down the first surface (rear surface) will be received by the first liquid receiving member 203 and guided via the opening 205 to the second surface (front surface), where it is held by the second liquid receiving member 204. In the turner according to the embodiment shown in FIG. 21, since the second liquid receiving member 204 is disposed around the circumference of the head portion, it is able to receive liquid flowing down over the liquid receiving member 203 on the first surface and liquid flowing down via the rim of the head portion, and the like. Desirably, the second liquid receiving member 204 is devised such that all of the liquid received thereby is guided onto the second surface (front surface), by forming the second liquid receiving member 204 such that it inclines downwards from the first surface towards the second surface of the head portion, as illustrated in FIG. 21. Moreover, it is also possible to provide liquid guiding plates 211 on the second face of the head portion, in such a manner that all of the liquid flowing down the second surface 207 is guided to the second liquid receiving member 204. Moreover, by forming brim-shaped liquid leading means 209 about the edges of the head portion, it is possible to guide the liquid to the liquid receiving member more effectively. Furthermore, if liquid leading means 209 are formed, then by providing liquid guiding members 210 on the sides of the liquid leading means 209 and connecting these liquid guiding members 210 to liquid guiding plates 211, it is possible to achieve a construction whereby the liquid is guided to the second surface of the head portion, and then further guided to the second liquid receiving member 204. Moreover, as shown in FIG. 22, it is also possible to form two or more openings 225 in the head portion. Furthermore, as shown in FIG. 23, for the opening in the head portion, it is also possible to form a slit 235 extending in a vertical direction.

Figure 24:
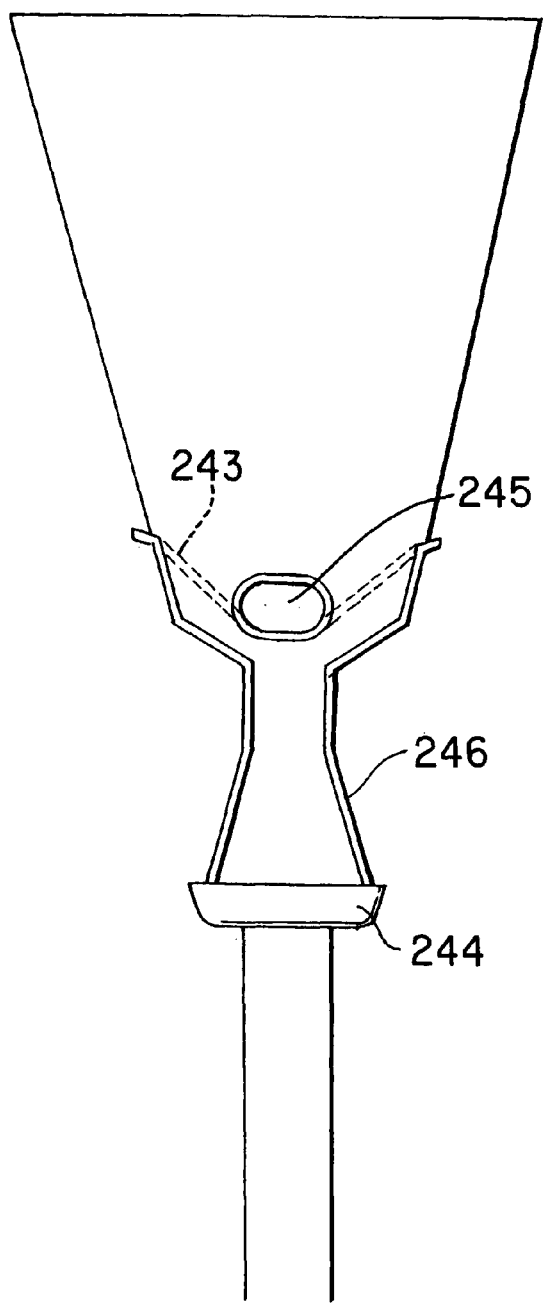
Figure 24:
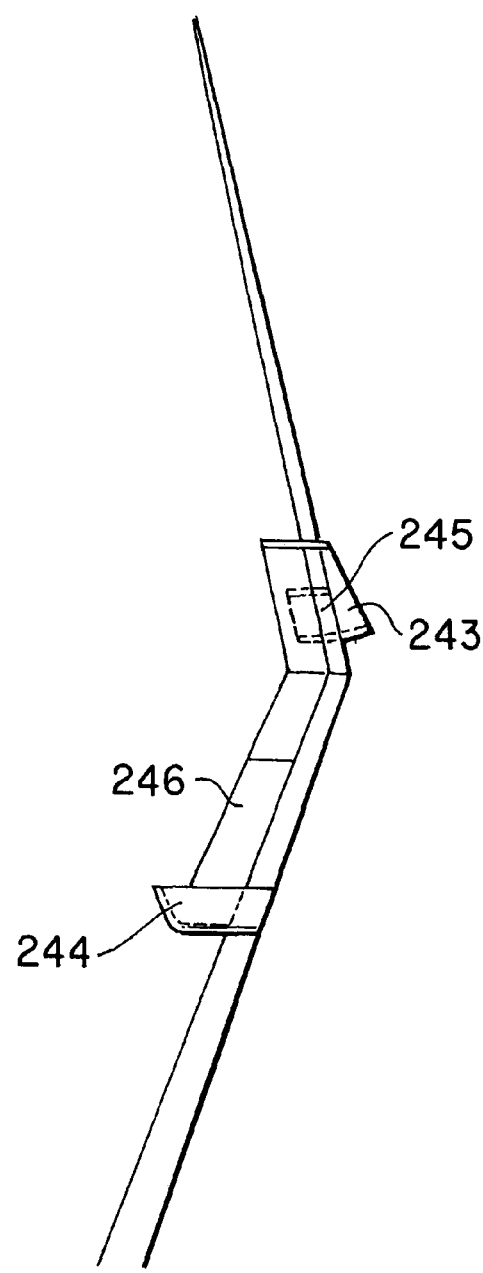
Figure 25:
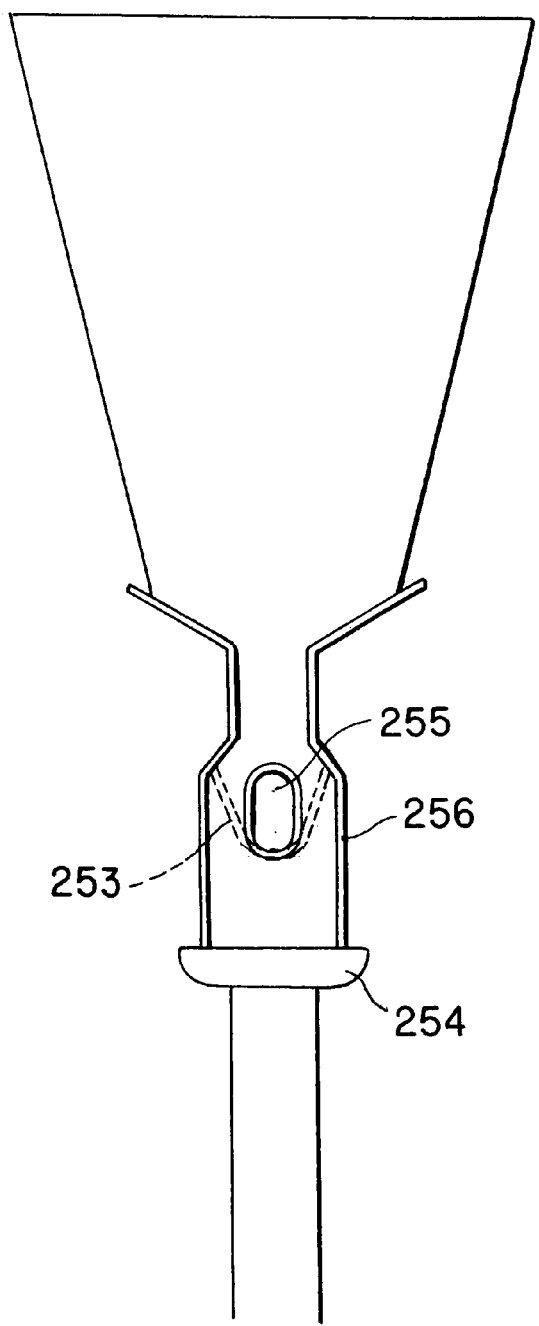
Figure 25:
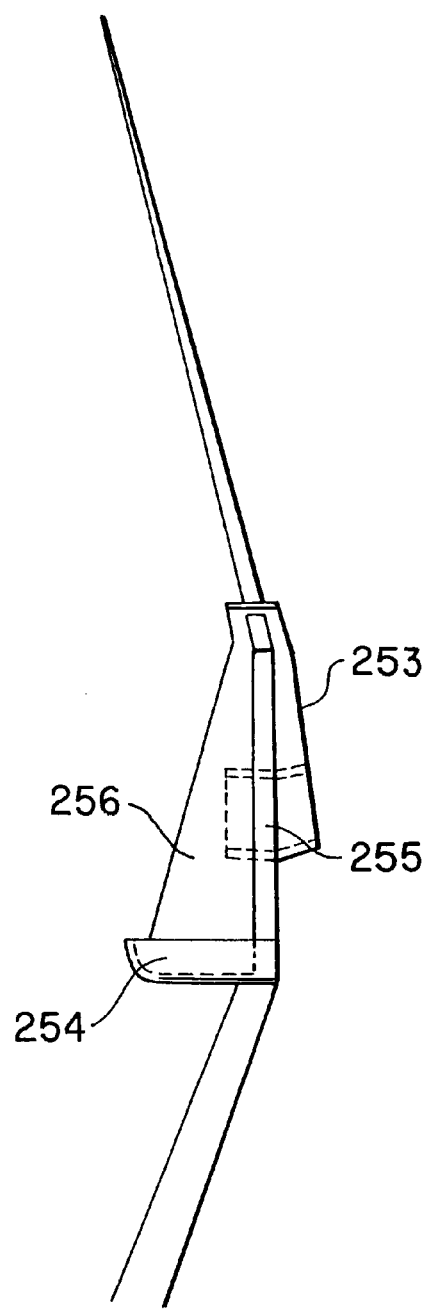

An important feature of the second embodiment of the present invention is that liquid receiving member is formed on the head portion of the cooking utensil, but in the second embodiment of the present invention, the expression "the liquid receiving member is formed on the head portion of the cooking utensil" does not strictly mean that the liquid receiving member is formed only on the bowl portion or the paddle portion, but rather that it can also be formed on other portions of the utensil, provided that the liquid adhering to the head portion is guided in an effective manner. For example, FIG. 24 illustrates a cooking utensil according to a further embodiment of the present invention, but here, liquid flowing down the first surface of the head portion is guided through an opening 245 to the second surface thereof, by means of the opening 245 and a first liquid receiving member 243 in the head portion, whereupon the liquid is guided by a liquid-guiding member 246 and received by a liquid receiving member 244 formed on the shank portion in a position adjacent to the head portion. Moreover, FIG. 25 shows a cooking utensil according to yet a further embodiment of the present invention, but here, liquid flowing down the first surface of the head portion is guided to the second surface by means of an opening 255 and a first liquid receiving member 253, whereupon the liquid is guided by a liquid guiding member 256 and received by a liquid receiving member 254 formed on the shank portion in a position adjacent to the head portion. These Embodiments are also included within the scope of the definition that "a liquid receiving member is formed in the head portion of a cooking utensil" according to the present invention.

Moreover, also in the cooking utensil according to the second embodiment of the present invention wherein a liquid receiving member is formed in the head portion, it is possible to provide one or more liquid receiving members in the shank portion thereof. The shape of the liquid receiving member that can be formed in the shank portion is similar to that described above in the first embodiment of the present invention. In a cooking utensil according to the second embodiment of the present invention wherein a liquid receiving member is formed in the head portion thereof, by providing a liquid receiving member in the shank portion also, it is possible to receive liquid which cannot be held by the liquid receiving member formed in the head portion of the cooking utensil and which flows down via the shank portion, when the cooking utensil is stood in an inverted state, thereby preventing soiling of the worktop or grip portion.

The foregoing description according to the present invention refers to a ladle and a turner as examples, but the technical innovation of the present invention may also be applied to any cooking utensil other than a ladle, which comprises a head portion for manipulating food, and a shank portion. In other words, in addition to a ladle or a turner, possible examples of cooking utensils according to the present invention include: a paddle, draining spoon, skimmer, whisk, rice paddle, measuring spoon, peeler, kitchen knife, table.knife, fork, spoon, and the like.

In the cooking utensil according to the present invention, any material, such as plastic, stainless steel, or the like, can be used for the head portion, a liquid receiving member, shank portion, and grip portion, and any coupling configuration between the various components can be adopted. For example, it is possible to form the head portion and shank portion as independent members and to connect same by welding, screw fitting, bonding, or the like, or alternatively, the head portion and shank portion can be formed integrally. The same applies to the other components. Moreover, in the various embodiments described in this specification, it is possible to select the shape, size, position, and the like, of the liquid receiving member in an optimum manner, while taking account of various factors, such as the type of cooking utensil, the size of the head portion, the type of food being handled, and the like.

Effect of the Invention

The cooking utensil according to the present invention can be stood in an approximately upright inverted state with the head portion thereof in an upward position, and therefore, when it is not being used temporarily, it can be stood in an approximately upright inverted state on a worktop, or the like, thereby saving space, in addition to which, since the head portion (or bowl portion) which comes into direct contact with food does not touch the worktop, or the like, the cooking utensil of the present invention can be stored temporarily in a hygienic manner. Moreover, since the cooking utensil according to the present invention is formed with a liquid receiving member in the shank portion and/or head portion thereof, it is possible to prevent liquid that has adhered to the head portion from flowing downward and being scattered, thereby soiling the worktop, or the like, when the utensil is stood in an inverted state, and consequently, the hygienic conditions of the worktop, or the like, can also be maintained.

What is claimed is:

1. An invertably standable cooking utensil comprising:

a shank portion, a head portion, a supporting member formed at an end section of the shank portion for supporting the cooking utensil in an inverted upright state with the head portion in an upward position, and a liquid receiving member formed on the shank portion, wherein an axis of the supporting member forms an angle smaller than a right-angle with respect to an axis of the shank portion.

2. The cooking utensil according to claim 1, wherein the cooking utensil comprises at least one of a ladle, scoop, turner, paddle, draining spoon, skimmer, whisk, rice paddle, measuring spoon, peeler, kitchen knife, table knife, fork and spoon.

3. An invertably standable cooking utensil comprising:

a shank portion, a head portion, a supporting member formed at an end section of the shank portion for supporting the cooking utensil in an inverted upright state with the head portion in an upward position, and a liquid receiving member formed on the head portion for receiving liquid adhering to the head portion when the cooking utensil is stood in the inverted upright state, wherein an axis of the supporting member forms an angle smaller than a right-angle with respect to an axis of the shank portion.

4. The cooking utensil according to claim 3, wherein the cooking utensil comprises at least one of is a ladle, scoop, turner, paddle, draining spoon, skimmer, whisk, rice paddle, measuring spoon, peeler, kitchen knife, table knife, fork and spoon.

5. The cooking utensil according to claim 3, wherein another liquid receiving member is formed on the shank portion.

6. The cooking utensil according to claim 5, wherein the cooking utensil comprises at least one of a ladle, scoop, turner, paddle, draining spoon, skimmer, whisk, rice paddle, measuring spoon, peeler, kitchen knife, table knife, fork and spoon.

7. The cooking utensil according to claim 3, wherein an opening is formed in the head portion, and liquid receiving members are formed respectively at different height positions on a first surface and a second surface of the head portion, in such a manner that liquid adhering to the first surface of the head portion passes through the opening and is guided to the second surface when the cooking utensil is stood in the inverted upright state.

8. The cooking utensil according to claim 7, wherein the cooking utensil comprises at least one of a ladle, scoop, turner, paddle, rice paddle, measuring spoon, kitchen knife, table knife, fork and spoon.

9. The cooking utensil according to claim 7, wherein another liquid receiving member is formed on the shank portion.

10. The cooking utensil according to claim 9, wherein the cooking utensil comprises at least one of a ladle, scoop, turner, paddle, draining spoon, skimmer, whisk, rice paddle, measuring spoon, peeler, kitchen knife, table knife, fork and spoon.

* * * * *

UNITED STATES PATENT AND TRADEMARK OFFICE
CERTIFICATE OF CORRECTION

PATENT NO. : 6,557,264 B1  Page 1 of 1
DATED : May 6, 2003
INVENTOR(S) : Yutaka Maeda It is certified that error appears in the above-identified patent and that said Letters Patent is hereby corrected as shown below:

<u>Title page,</u>
Item [73], Assignee: after "(JP)", add -- 50% --.

Signed and Sealed this

Second Day of September, 2003

JAMES E. ROGAN
*Director of the United States Patent and Trademark Office*